(12) United States Patent
Soltys et al.

(10) Patent No.: US 7,404,765 B2
(45) Date of Patent: Jul. 29, 2008

(54) DETERMINING GAMING INFORMATION

(75) Inventors: Richard Soltys, Mercer Island, WA (US); Richard Huizinga, Mercer Island, WA (US)

(73) Assignee: Bally Gaming International, Inc., Las Vegas, NV (US)

( * ) Notice: Subject to any disclaimer, the term of this patent is extended or adjusted under 35 U.S.C. 154(b) by 820 days.

(21) Appl. No.: 10/358,999

(22) Filed: Feb. 4, 2003

(65) Prior Publication Data

US 2003/0220136 A1    Nov. 27, 2003

Related U.S. Application Data

(60) Provisional application No. 60/354,730, filed on Feb. 5, 2002.

(51) Int. Cl.
G06F 17/00 (2006.01)
(52) U.S. Cl. ...................................................... 463/25
(58) Field of Classification Search ....................... None
See application file for complete search history.

(56) References Cited

U.S. PATENT DOCUMENTS

| | | | |
|---|---|---|---|
| 3,766,452 A | 10/1973 | Burpee et al. | 317/262 R |
| 3,787,660 A | 1/1974 | Meyers et al. | 235/61.9 R |
| 3,810,172 A | 5/1974 | Burpee et al. | 343/5 PD |
| 4,026,309 A | 5/1977 | Howard | 133/8 R |
| 4,108,361 A | 8/1978 | Krause | 235/375 |
| 4,135,663 A | 1/1979 | Nojiri et al. | 235/463 |
| 4,467,424 A | 8/1984 | Hedges et al. | 364/412 |
| 4,475,564 A | 10/1984 | Koester et al. | 133/8 R |
| 4,518,001 A | 5/1985 | Branham | 133/5 R |
| 4,531,187 A * | 7/1985 | Uhland | 463/12 |
| 4,534,562 A | 8/1985 | Cuff et al. | 273/149 P |
| 4,636,846 A | 1/1987 | Villareal | 358/100 |
| 4,636,896 A | 1/1987 | Takikawa | 360/105 |
| 4,656,463 A | 4/1987 | Anders et al. | 340/572 |
| 4,662,637 A | 5/1987 | Pfeiffer | 273/149 P |
| 4,667,959 A | 5/1987 | Pfeiffer et al. | 273/149 R |
| 4,693,480 A | 9/1987 | Smith | 273/296 |
| 4,750,743 A | 6/1988 | Nicoletti | 273/148 A |

(Continued)

FOREIGN PATENT DOCUMENTS

DE          44 39 502 C1      9/1995

(Continued)

OTHER PUBLICATIONS

Bulavsky, J., "Tracking the Tables," *Casino Journal*, pp. 44-47, May 2004.

(Continued)

*Primary Examiner*—Ronald Laneau
*Assistant Examiner*—Tramar Harper
(74) *Attorney, Agent, or Firm*—Seed IP Law Group PLLC

(57) ABSTRACT

A method for determining wagers by applying a chip denomination representation, having at least one angle associated with at least one color transition, against a working chip template. A related system includes, but is not limited to, circuitry and/or programming for effecting the foregoing-referenced method; the circuitry and/or programming can be virtually any combination of hardware, software, and/or firmware configured to effect the foregoing-referenced method embodiments depending upon the design choices of the system designer.

28 Claims, 17 Drawing Sheets

U.S. PATENT DOCUMENTS

| | | | | |
|---|---|---|---|---|
| 4,755,941 A | 7/1988 | Bacchi | | 364/412 |
| 4,814,583 A | 3/1989 | Rainey | | 219/494 |
| 4,814,589 A * | 3/1989 | Storch et al. | | 235/375 |
| 4,822,050 A | 4/1989 | Normand et al. | | 273/149 P |
| 4,861,041 A | 8/1989 | Jones et al. | | 273/292 |
| 4,926,996 A | 5/1990 | Eglise et al. | | 194/212 |
| 4,951,950 A | 8/1990 | Normand et al. | | 273/149 P |
| 4,978,322 A | 12/1990 | Paulsen | | 453/57 |
| 5,007,641 A | 4/1991 | Seidman | | 273/138 A |
| 5,067,713 A | 11/1991 | Soules et al. | | 273/149 P |
| 5,103,081 A | 4/1992 | Fisher et al. | | 235/464 |
| 5,114,153 A | 5/1992 | Rosenwinkel et al. | | 273/292 |
| 5,121,921 A | 6/1992 | Friedman et al. | | 273/149 P |
| 5,166,502 A | 11/1992 | Rendleman et al. | | 235/492 |
| 5,167,571 A | 12/1992 | Waller | | 453/29 |
| 5,186,464 A | 2/1993 | Lamle | | 273/149 R |
| 5,199,710 A | 4/1993 | Lamle | | 273/149 R |
| 5,216,234 A * | 6/1993 | Bell | | 235/494 |
| 5,258,837 A | 11/1993 | Gormley | | 358/140 |
| 5,283,422 A | 2/1994 | Storch et al. | | 235/375 |
| 5,319,181 A | 6/1994 | Shellhammer et al. | | 235/462 |
| 5,343,028 A | 8/1994 | Figarella et al. | | 235/462 |
| 5,364,104 A | 11/1994 | Jones et al. | | 273/292 |
| 5,374,061 A | 12/1994 | Albrecht | | 273/149 R |
| 5,397,133 A | 3/1995 | Penzias | | 273/439 |
| 5,406,264 A | 4/1995 | Plonsky et al. | | 340/572 |
| 5,416,308 A | 5/1995 | Hood et al. | | 235/454 |
| 5,431,399 A | 7/1995 | Kelley | | 273/149 P |
| 5,435,778 A | 7/1995 | Castle et al. | | 453/32 |
| 5,458,333 A | 10/1995 | Takemoto et al. | | 273/137 A |
| 5,470,079 A | 11/1995 | LeStrange et al. | | 273/138 A |
| 5,505,461 A | 4/1996 | Bell et al. | | 273/433 |
| 5,548,110 A | 8/1996 | Storch et al. | | 235/472 |
| 5,586,936 A | 12/1996 | Bennett et al. | | 463/25 |
| 5,605,334 A | 2/1997 | McCrea, Jr. | | 273/309 |
| 5,613,680 A | 3/1997 | Groves et al. | | 273/138.2 |
| 5,613,912 A | 3/1997 | Slater | | 463/25 |
| 5,645,486 A | 7/1997 | Nagao et al. | | 463/27 |
| 5,651,548 A | 7/1997 | French et al. | | 273/309 |
| 5,669,816 A | 9/1997 | Garczynski et al. | | 463/12 |
| 5,676,231 A | 10/1997 | Legras et al. | | 194/206 |
| 5,698,839 A | 12/1997 | Jagielinski et al. | | 235/493 |
| 5,707,287 A | 1/1998 | McCrea, Jr. | | 463/27 |
| 5,722,893 A | 3/1998 | Hill et al. | | 463/47 |
| 5,735,525 A | 4/1998 | McCrea, Jr. | | 273/309 |
| 5,735,742 A | 4/1998 | French | | 463/25 |
| 5,742,656 A | 4/1998 | Mikulak et al. | | 377/7 |
| 5,755,618 A | 5/1998 | Mothwurf | | 453/17 |
| 5,757,876 A | 5/1998 | Dam et al. | | 377/7 |
| 5,759,103 A | 6/1998 | Freels et al. | | 463/42 |
| 5,766,075 A | 6/1998 | Cook et al. | | 463/25 |
| 5,770,533 A | 6/1998 | Franchi | | 463/42 |
| 5,779,546 A | 7/1998 | Meissner et al. | | 463/25 |
| 5,780,831 A | 7/1998 | Seo et al. | | 235/462 |
| 5,781,647 A * | 7/1998 | Fishbine et al. | | 382/100 |
| 5,785,321 A | 7/1998 | Van Putten et al. | | 273/309 |
| 5,788,574 A * | 8/1998 | Ornstein et al. | | 463/25 |
| 5,801,766 A | 9/1998 | Alden | | 348/157 |
| 5,803,808 A | 9/1998 | Strisower | | 463/11 |
| 5,809,482 A | 9/1998 | Strisower | | 705/30 |
| 5,830,064 A | 11/1998 | Bradish et al. | | 463/22 |
| 5,842,921 A | 12/1998 | Mindes et al. | | 463/16 |
| 5,895,321 A | 4/1999 | Gassies et al. | | 463/29 |
| 5,909,876 A | 6/1999 | Brown | | 273/309 |
| 5,910,044 A | 6/1999 | Luciano, Jr. et al. | | 453/32 |
| 5,911,626 A | 6/1999 | McCrea, Jr. | | 463/27 |
| 5,919,090 A | 7/1999 | Mothwurf | | 463/25 |
| 5,931,731 A | 8/1999 | Chwalisz | | 453/32 |
| 5,941,769 A * | 8/1999 | Order | | 463/12 |
| 5,957,776 A | 9/1999 | Hoehne | | 463/25 |
| 5,989,122 A | 11/1999 | Roblejo | | 463/22 |
| 6,003,013 A | 12/1999 | Boushy et al. | | 705/10 |
| 6,003,651 A | 12/1999 | Waller et al. | | 194/202 |
| 6,021,949 A | 2/2000 | Boiron | | 235/492 |
| 6,029,891 A | 2/2000 | Freeman et al. | | 235/380 |
| 6,032,955 A | 3/2000 | Luciano et al. | | 273/138.1 |
| 6,039,650 A | 3/2000 | Hill | | 463/47 |
| 6,093,103 A | 7/2000 | McCrea, Jr. | | 463/27 |
| 6,106,395 A | 8/2000 | Begis | | 463/23 |
| 6,113,493 A | 9/2000 | Walker et al. | | 463/25 |
| 6,117,012 A | 9/2000 | McCrea, Jr. | | 463/27 |
| 6,126,166 A | 10/2000 | Lorson et al. | | 273/148 R |
| 6,142,876 A | 11/2000 | Cumbers | | 463/25 |
| 6,154,131 A * | 11/2000 | Jones et al. | | 340/540 |
| 6,165,069 A | 12/2000 | Sines et al. | | 463/12 |
| 6,165,071 A | 12/2000 | Weiss | | 463/24 |
| 6,166,763 A | 12/2000 | Rhodes et al. | | 348/143 |
| 6,168,513 B1 | 1/2001 | Souza et al. | | 453/57 |
| 6,183,362 B1 | 2/2001 | Boushy | | 463/25 |
| 6,186,895 B1 | 2/2001 | Oliver | | 463/25 |
| 6,200,218 B1 | 3/2001 | Lindsay | | 463/25 |
| 6,203,856 B1 | 3/2001 | Ottersbach et al. | | 427/385.5 |
| 6,217,447 B1 | 4/2001 | Lofink et al. | | 463/12 |
| 6,220,954 B1 | 4/2001 | Nguyen et al. | | 453/57 |
| 6,234,898 B1 | 5/2001 | Belamant et al. | | 463/25 |
| 6,254,484 B1 | 7/2001 | McCrea, Jr. | | 463/27 |
| 6,264,109 B1 | 7/2001 | Chapet et al. | | 235/492 |
| 6,267,671 B1 | 7/2001 | Hogan | | 463/25 |
| 6,283,856 B1 | 9/2001 | Mothwurf | | 463/17 |
| 6,299,534 B1 | 10/2001 | Breeding et al. | | 463/25 |
| 6,299,536 B1 | 10/2001 | Hill | | 463/47 |
| 6,313,871 B1 * | 11/2001 | Schubert | | 348/143 |
| 6,346,044 B1 | 2/2002 | McCrea, Jr. | | 463/27 |
| 6,352,261 B1 | 3/2002 | Brown | | 273/288 |
| 6,425,817 B1 | 7/2002 | Momemy | | 453/17 |
| 6,446,864 B1 | 9/2002 | Kim et al. | | 235/382 |
| 6,457,715 B1 | 10/2002 | Friedman | | 273/274 |
| 6,460,848 B1 | 10/2002 | Soltys et al. | | 273/149 R |
| 6,464,584 B2 | 10/2002 | Oliver | | 463/25 |
| 6,503,147 B1 | 1/2003 | Stockdale et al. | | 463/29 |
| 6,508,709 B1 | 1/2003 | Karmarkar | | 463/42 |
| 6,514,140 B1 | 2/2003 | Storch | | 463/25 |
| 6,517,435 B2 | 2/2003 | Soltys et al. | | 463/25 |
| 6,517,436 B2 | 2/2003 | Soltys et al. | | 463/29 |
| 6,517,437 B2 | 2/2003 | Wells et al. | | 463/30 |
| 6,520,857 B2 | 2/2003 | Soltys et al. | | 463/29 |
| 6,527,271 B2 | 3/2003 | Soltys et al. | | 273/148 R |
| 6,530,836 B2 | 3/2003 | Soltys et al. | | 463/29 |
| 6,530,837 B2 | 3/2003 | Soltys et al. | | 463/29 |
| 6,532,297 B1 | 3/2003 | Lindquist | | 382/100 |
| 6,533,276 B2 | 3/2003 | Soltys et al. | | 273/148 R |
| 6,533,662 B2 | 3/2003 | Soltys et al. | | 463/25 |
| 6,567,159 B1 * | 5/2003 | Corech | | 356/71 |
| 6,575,834 B1 | 6/2003 | Lindo | | 463/40 |
| 6,579,180 B2 | 6/2003 | Soltys et al. | | 463/25 |
| 6,579,181 B2 | 6/2003 | Soltys et al. | | 463/25 |
| 6,581,747 B1 | 6/2003 | Charlier et al. | | 194/214 |
| 6,595,857 B2 | 7/2003 | Soltys et al. | | 463/29 |
| 6,620,046 B2 | 9/2003 | Rowe | | 463/25 |
| 6,629,591 B1 | 10/2003 | Griswold et al. | | 194/205 |
| 6,629,889 B2 | 10/2003 | Mothwurf | | 463/25 |
| 6,638,161 B2 | 10/2003 | Soltys et al. | | 462/12 |
| 6,645,077 B2 | 11/2003 | Rowe | | 463/42 |
| 6,663,490 B2 | 12/2003 | Soltys et al. | | 463/25 |
| 6,685,564 B2 | 2/2004 | Oliver | | 463/25 |
| 6,688,979 B2 | 2/2004 | Soltys et al. | | 463/25 |
| 6,712,696 B2 | 3/2004 | Soltys et al. | | 463/25 |
| 6,729,956 B2 | 5/2004 | Wolf et al. | | 463/25 |
| 6,755,741 B1 | 6/2004 | Rafaeli | | 463/25 |
| 6,758,751 B2 | 7/2004 | Soltys et al. | | 463/29 |
| 6,848,994 B1 | 2/2005 | Knust et al. | | 463/25 |
| 7,029,009 B2 | 4/2006 | Grauzer et al. | | 273/149 P |
| 2002/0084587 A1 | 7/2002 | Bennett et al. | | 273/309 |
| 2002/0086727 A1 | 7/2002 | Soltys et al. | | 463/22 |

| | | | |
|---|---|---|---|
| 2002/0147042 A1 | 10/2002 | Vuong et al. | 463/40 |
| 2002/0165029 A1 | 11/2002 | Soltys et al. | 463/47 |
| 2002/0187821 A1 | 12/2002 | Soltys et al. | 463/11 |
| 2003/0064798 A1 | 4/2003 | Grauzer et al. | 463/29 |
| 2003/0195037 A1 | 10/2003 | Vuong et al. | 463/29 |
| 2003/0212597 A1 | 11/2003 | Ollins | 705/14 |
| 2003/0220136 A1 | 11/2003 | Soltys et al. | 463/25 |
| 2004/0005920 A1 | 1/2004 | Soltys et al. | 463/25 |
| 2004/0043820 A1 | 3/2004 | Schlottmann | 463/43 |
| 2004/0207156 A1 | 10/2004 | Soltys et al. | 273/292 |
| 2004/0219982 A1 | 11/2004 | Khoo et al. | 463/42 |
| 2004/0229682 A1 | 11/2004 | Gelinotte | 463/25 |
| 2005/0026680 A1 | 2/2005 | Gururajan | 463/25 |
| 2005/0051955 A1 | 3/2005 | Schubert et al. | 273/149 R |
| 2005/0051965 A1 | 3/2005 | Gururajan | 273/292 |
| 2005/0054408 A1 | 3/2005 | Steil et al. | 463/11 |
| 2005/0059479 A1 | 3/2005 | Soltys et al. | 463/29 |
| 2005/0062226 A1 | 3/2005 | Schubert et al. | 273/149 R |
| 2005/0073102 A1 | 4/2005 | Yoseloff et al. | 273/292 |
| 2005/0101367 A1 | 5/2005 | Soltys et al. | 463/12 |
| 2005/0116020 A1 | 6/2005 | Smolucha et al. | 235/375 |
| 2005/0164761 A1 | 7/2005 | Tain | 463/13 |
| 2005/0236771 A1 | 10/2005 | Soltys et al. | 273/274 |
| 2005/0258597 A1 | 11/2005 | Soltys et al. | 273/274 |
| 2005/0288083 A1 | 12/2005 | Downs, III | 463/11 |
| 2005/0288084 A1 | 12/2005 | Schubert | 463/11 |
| 2005/0288085 A1 | 12/2005 | Schubert et al. | 463/11 |
| 2006/0019739 A1 | 1/2006 | Soltys et al. | 273/292 |

FOREIGN PATENT DOCUMENTS

| | | |
|---|---|---|
| DE | 197 48 930 A1 | 5/1998 |
| EP | 0 327 069 A2 | 8/1989 |
| EP | 0 790 848 | 8/1997 |
| FR | 2 775 196 | 8/1999 |
| GB | 2 382 034 A | 5/2003 |
| WO | WO 96/03188 | 2/1996 |
| WO | WO 96/36253 | 11/1996 |
| WO | WO 97/13227 | 4/1997 |
| WO | WO 00/22585 | 4/2000 |
| WO | WO 00/62880 | 10/2000 |
| WO | WO 02/05914 A1 | 1/2002 |
| WO | WO 03/60846 A2 | 7/2003 |

OTHER PUBLICATIONS

U.S. Appl. No. 11/030,609, filed Jan. 5, 2005, Soltys et al.
U.S. Appl. No. 11/408,862, filed Apr. 21, 2006, Soltys et al.
U.S. Appl. No. 11/437,590, filed May 19, 2006, Soltys et al.
U.S. Appl. No. 11/479,988, filed Jun. 30, 2006, Shayesteh.
U.S. Appl. No. 11/480,274, filed Jun. 30, 2006, Huizinga.
U.S. Appl. No. 11/519,244, filed Sep. 11, 2006, Soltys et al.
U.S. Appl. No. 60/554,090, filed Mar. 17, 2004, Soltys et al.
U.S. Appl. No. 60/838,280, filed Aug. 17, 2006, Soltys et al.
U.S. Appl. No. 60/847,331, filed Sep. 26, 2006, Shayesteh.
Burke, A., "Tracking the Tables," reprinted from *International Gaming & Wagering Business*, Aug. 2003, 4 pages.
Gros, R., "All You Ever Wanted to Know About Tabel Games," reprinted from *Global Gaming Business*, Aug. 1, 2003, 2 pages.
Pro, L.V., "Book Review—The Card Counter's Guide to Casino Surveillance," *Blackjack Insider Newsletter*, May 2003, #40, accessed Aug. 25, 2006, URL= http:/bjinsider.com/newsletter_40_surveillance.shtml, 5 pages.
Snyder, A., "The High-Tech Eye," excerpt from *Blackjack Forum*, Spring 1997, accessed Dec. 21, 2005, from Casino Software & Services, LLC, URl= http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL= http://www.casinosoftware.com/gaming_today.html.
Winkler, C., "Product Spotlight: MindPlay," reprinted from *Gaming and Leisure Technology*, Fall 2003, 2 pages.
Bally TMS, "MP21—Automated Table Tracking/Features," 2 pages, Nov. 2005.
Bally TMS, "MPLite—Table Management System/Features," 2 pages, Nov. 2005.
Bravo Gaming Systems, "Casino Table Wager Analysis and Player Tracking System—Table Operations/Unique Features," accessed Apr. 11, 2005, URL= http://www.genesisgaming.com, 4 pages.
Casino Software & Services, LLC., accessed Aug. 25, 2006, URL= http:/casinosoftware.com/home.html, 6 pages.
*Gambling Magazine*, "Gaming Company Takes RFID to the Casino" Dec. 27, 2004, accessed Aug. 25, 2006, URL= http://www.gamblingmagazine.com/managearticle.asp?C=290&A=13186, 4 pages.
International Guild of Hospitality & Restaurant Managers, "Shuffle Master, Inc. (NasdaqNM:SHFL)," accessed Dec. 30, 2003, URL= http://hospitalityguide.com/Financial/Casinos/Shuffle.htm, 3 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents The Ultimate Player Rating System . . . Bloodhound Sniffs Out the Pros and Cons," Dec. 31, 1997, 6 pages.
U.S. Appl. No. 60/887,092, filed Jan. 29, 2007, Shayesteh.
English Translation of German Patent No. DE 197 48 930, publication date of May 14, 1998, inventor: Markeev.
US 6,599,191, 07/2003, Breeding et al. (withdrawn)

* cited by examiner

Note: The information associated with the chip denomination representation is the angles [theta 1, theta 8] and the colors [red, white, green, white, green].

Minimum Lines of Color
Transition Needed to Identify Chip in Side View = 4

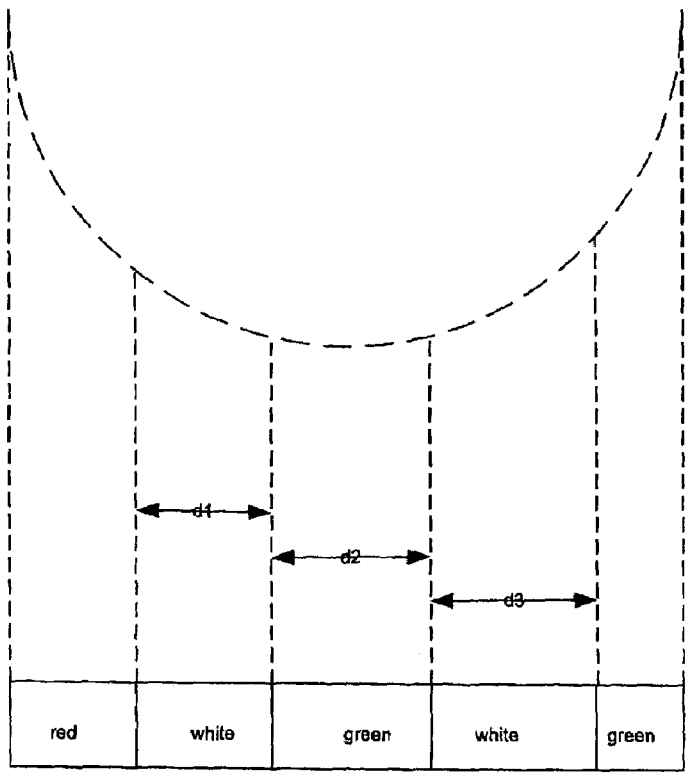

The information from the vertical color transitions of the portion of the image currently being evaluated consists of the colors and the distances d1, d2, d3. From this information, we can compute the circle center and the radius.

An example of what the camera sees: a side-plan view 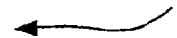

since outermost edges in image of chip may not actually be color transitions (e.g. the leftmost red band may actually wrap around the back of the chip, and hence the color does not transition until somewhere on the back of the chip), processes and chip representations used by processes do not treat outermost edges as color transitions

*FIG. 7*

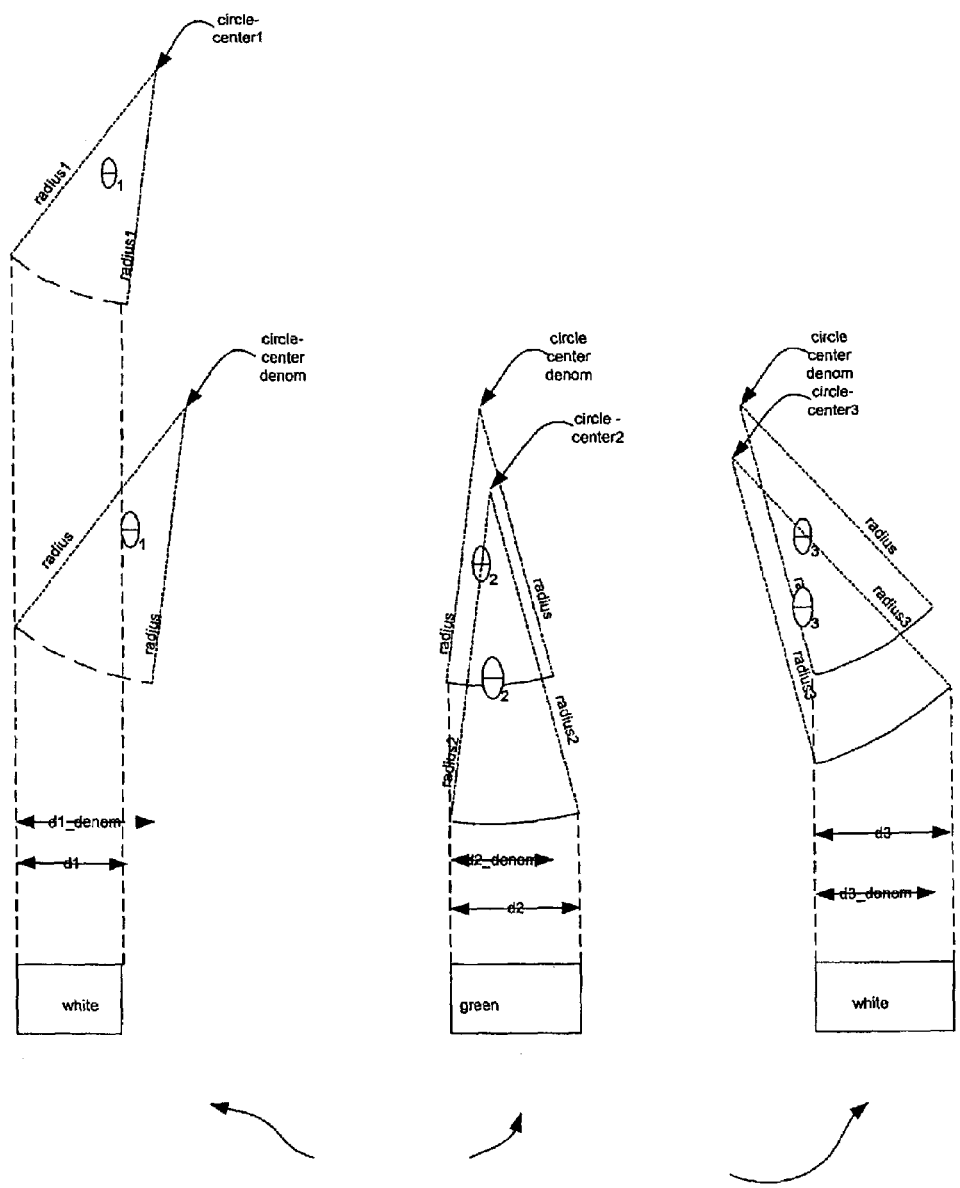

Colors, associated distance values captured by the camera and corresponding calculated radiuses and circle-center values are shown in the context of the colors, associated radius, and associated angles of chip denomination representation for sake of illustration and ease of understanding. Note that the angles stay the same throughout, since a change in the size of how an image of a chip is viewed will not change such angles.

FIG. 8

DETERMINING GAMING INFORMATION

CROSS-REFERENCE TO RELATED APPLICATION

This application claims the benefit of U.S. Provisional Patent Application No. 60/354,730 filed 5 Feb. 2002, where this provisional application is incorporated herein by reference in its entirety.

BACKGROUND OF THE INVENTION

1. Field of the Invention

The present description generally relates to monitoring various aspects of casinos and gaming, and more specifically relates to automated game and wager tracking and analysis.

2. Description of the Related Art

Casinos and other forms of gaming are a multi-billion dollar, world-wide industry. Typically, a customer exchanges currency or some form of credit for a casino's chips. The customer places the chips as wagers at various games, such as blackjack, craps, roulette, and baccarat. A game operator, such as a dealer, pays out winning wagers with additional chips based on the set of odds for the particular game. The dealer collects the customer's chips for losing wagers. The odds of each game slightly favor the casino, so on average the casino wins and is profitable.

Like many businesses, casinos wish to understand the habits of their customers. Some casinos have employees visually observe customer's game play, manually tracking the gaming and wagering habits of the particular customers. For example, "pit managers" often visually monitors and records the live play of a game at the gaming table. Based on this visual monitoring, the pit managers try to guess what people are betting, and based on such betting the casino provides rewards to the customer in the form of complementary benefits, or "comps."

The inventors have empirically determined that having human pit managers manually monitor and estimate customers' wagering habits is very inaccurate. For instance, in one recent study the inventors found accuracy of the human pit managers to vary widely, all the way from 30% accuracy up to 90%. In addition, the current method of using human pit managers to monitor customers' gaming activities is extremely labor intensive for the casinos.

Like many businesses, casinos wish to prevent their customers from cheating. The fast pace and large sums of money make casinos likely targets for cheating and stealing. In one commonly known method of cheating the casino, players count cards in games of blackjack (which the casinos view as cheating), and increase their wagers in lockstep with the increasing probability of a winning hand based on the card counting.

Casinos employ a variety of security measures to discourage such cheating. One measure is to track both the hands played and wagers of a blackjack player to determine if the pattern of wagers plus hands played give rise to an inference that the player is counting cards. For example, surveillance cameras covering a gaming area or particular gaming table provide a live or taped video signal that security personnel closely examine. However, as with the pit managers, the accuracy of such counter-cheating measures suffers due to the inability to track the often rapidly changing wagers made during a game.

It is therefore apparent that a need exists in the art for a method and system that can accurately track wagers during gaming.

SUMMARY OF THE INVENTION

A method for determining wagers by applying a chip denomination representation, having at least one angle associated with at least one color transition, against a working chip template. In one illustrated embodiment, a method includes: acquiring an image of a gaming table having a bet circle; selecting an area of the image proximate to the bet circle; detecting color transitions at least partially in the area; conforming the color transitions to the area to create area-conformed color transitions; constructing a working chip template from the area-conformed color transitions; recalling a first chip denomination representation from a chip denomination representation library, the first chip denomination representation having at least one angle associated with at least one color transition; applying the first chip denomination representation against the working chip template; and calculating a first chip score responsive to said applying the first chip denomination. Other method embodiments are disclosed herein.

Various illustrated system embodiments include, but are not limited to, circuitry and/or programming for effecting the foregoing-referenced method; the circuitry and/or programming can be virtually any combination of hardware, software, and/or firmware configured to effect the foregoing-referenced method embodiments depending upon the design choices of the system designer.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the non-limiting detailed description set forth herein

BRIEF DESCRIPTION OF THE DRAWINGS

FIG. 7 shows an example of calculation of distances between color transitions that define color bands.

FIG. 8 shows an example of how the process uses the calculated distances d1, d2, and d3 in isolation, along with the side plan views of the chip denomination representation under consideration, to calculate hypothetical radius values and hypothetical circle center values.

The use of the same symbols in different drawings typically indicates similar or identical items.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with computers, computer networks, readers and machine-vision have not been shown or described in detail to avoid unnecessarily obscuring descriptions of the embodiments of the invention.

The headings provided herein are for convenience only and do not interpret the scope or meaning of the claimed invention.

This description initially presents a general explanation of gaming and gaming table monitoring components in the environment of a blackjack table. A more specific description of each of the individual hardware components and the interaction of the hardware components follows. A description of the overall operation of the system follows the hardware discussion. A more specific discussion of the operation of the system follows, presented in terms of discrete software modules. The presentation concludes with a discussion of a network of gaming tables.

Blackjack Gaming

In the following description, certain specific details are set forth in order to provide a thorough understanding of various embodiments of the invention. However, one skilled in the art will-understand that the invention may be practiced without these details. In other instances, well-known structures associated with computers, computer networks, readers and machine-vision have not been shown or described in detail to avoid unnecessarily obscuring descriptions of the embodiments of the invention.

The headings provided herein are for convenience only and do not interpret the scope or meaning of the claimed invention.

Blackjack Gaming Environment

Figure 1:
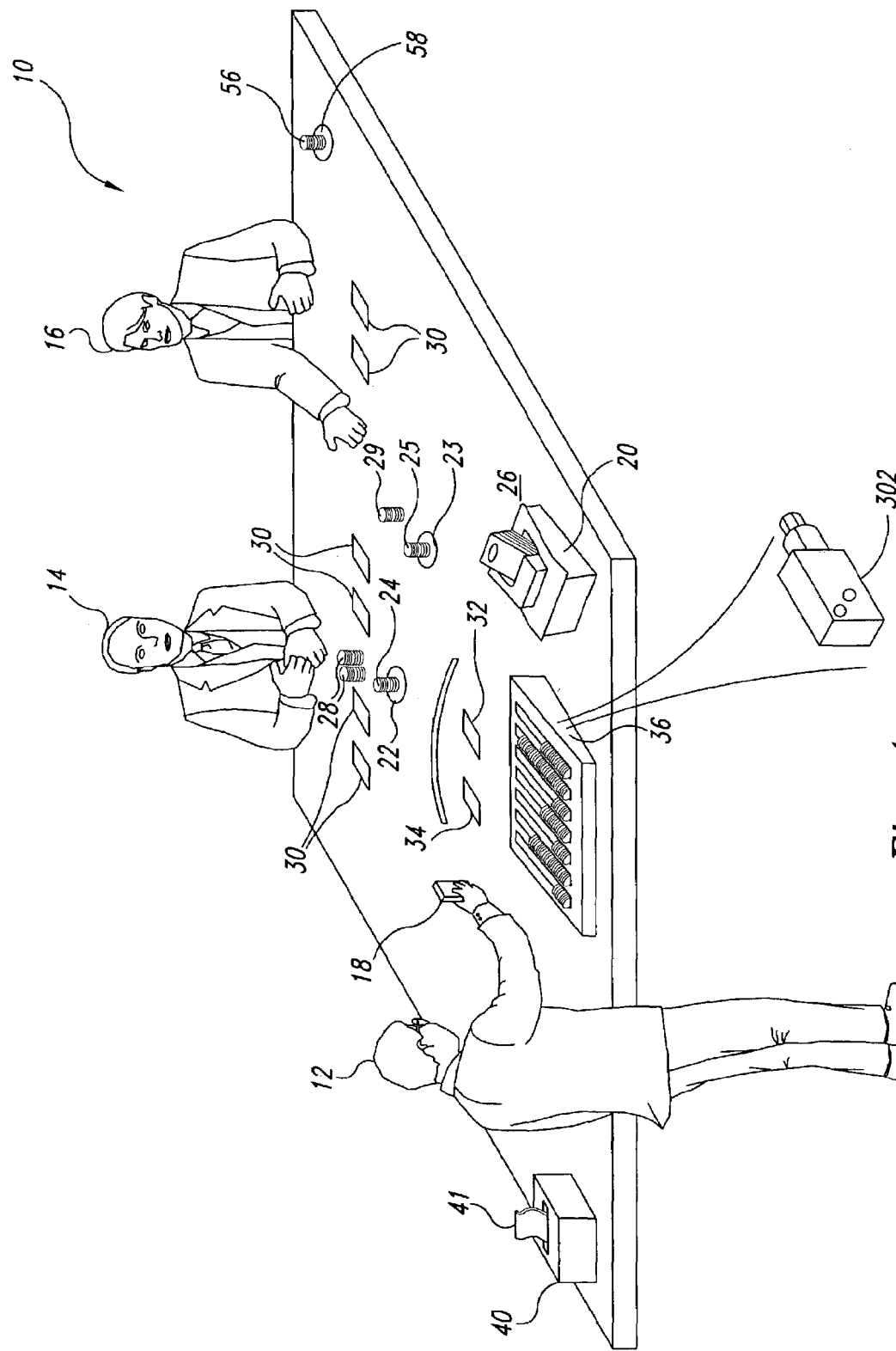
FIG. 1 is an isometric view of a game played at a gaming table by a dealer and players utilizing the present invention.

FIG. 1 shows a game of blackjack being played at gaming table 10 by dealer 12 and players 14, 16. Blackjack is used as an example. The teachings herein are generally applicable to a variety of wagering games, such as craps, baccarat, poker, wheel of fortune, and roulette.

During a game, each player 14, 16 places her respective wager by selecting a number of chips from her respective chip reserve 28, 29 and subsequently placing the selected number of chips in her respective bet circle 22, 23. The number of chips in each bet circle 22, 23 constitute the respective bet stacks 24, 25 of each player 14, 16.

The chips typically come in a variety of denominations. Players 14, 16 are issued chips in exchange for currency or credit by the casino's tellers. Casinos typically require the use of chips for wagering, rather than actual currency.

After players 14, 16 have placed an initial wager of chips in their respective bet circles 22, 23, dealer 12 deals each player 14, 16 two cards 30 face down, and deals herself one card 32 face down ("hole card") and one card 34 face up ("show card") from deck 18. Players 14, 16 can accept additional cards ("hits") from deck 18 as each player 14, 16 attempts to reach a total card value of "21" without going over, where face cards count as ten points, and Aces can count as either one or eleven points, at the cardholder's option. Dealer 12 also attempts to reach "21" without going over, although the rules typically require dealer 12 to take a hit when holding a "soft 17." Players 14, 16 can vary their respective wagers (e.g., the number and/or denomination of chips in bet stacks 22, 23) after the initial cards 30-34 are dealt based on their knowledge of their own hand and the dealer's face up card 34. For example, each player 14, 16 can "hit" or "stand" and may "double down" or "buy insurance."

At the end of a "hand" or game, dealer 12 collects the wager chips from any losing players and pays out winnings in chips to any winning players. The winnings are calculated as a multiple of a set of odds for the game and the amount of wager chips in the respective bet stacks 24, 25. The losses are typically the amount of wager chips in the respective bet stacks 24, 25. Dealer 12 places the collected wager chips or "take" from any losing players into a gaming table bank that takes the form of chip tray 36. Dealer 12 pays out the winnings using the required number of chips from chip tray 36. Changes to the contents of bet stacks 22, 23 occur quickly throughout the game and can affect the winnings and losses of the casino ("house") at gaming table 10. Thus, maintaining an accurate count of the number and value of the chips in bet stacks 24, 25 can assist the casino in managing its operations.

Chips

Figure 2:
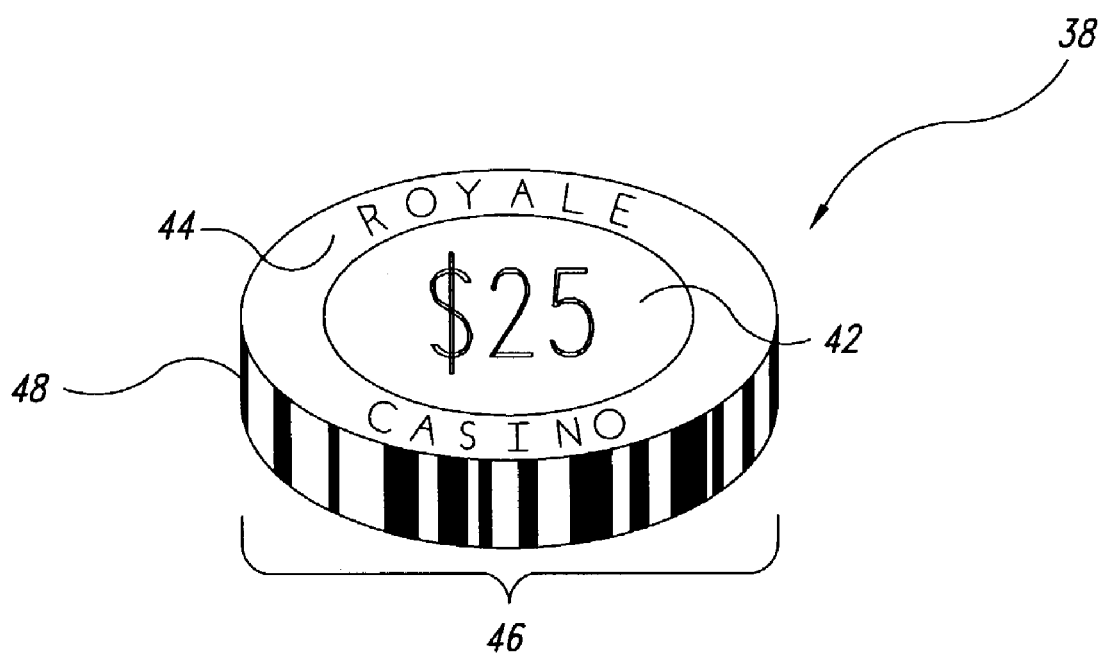
FIG. 2 is an isometric view of a casino chip of the present invention.

FIG. 2 depicts wager chip 38 illustrating components typically present in/on wager chips. Chip 38 is typically formed as a circular disk in a variety of denominations or values. The denomination, or value, of chip 38 is often represented by a numeric marking on face 42 of chip 38. Chip 38 also typically includes a pattern of various shaped and/or colored geometric markings 46 (e.g., vertical lines, diamond shapes, stars, etc.) about perimeter 48 of chip 38, which encode the denomination of the chip and which also may encode information such as the issuing casino of chip 38. Dealer 12 and players 14, 16 can generally determine at least the denomination of chip 38 by visual inspection of markings 46 on perimeter 48 of chip 38.

Gaming Recognition

Figure 3:
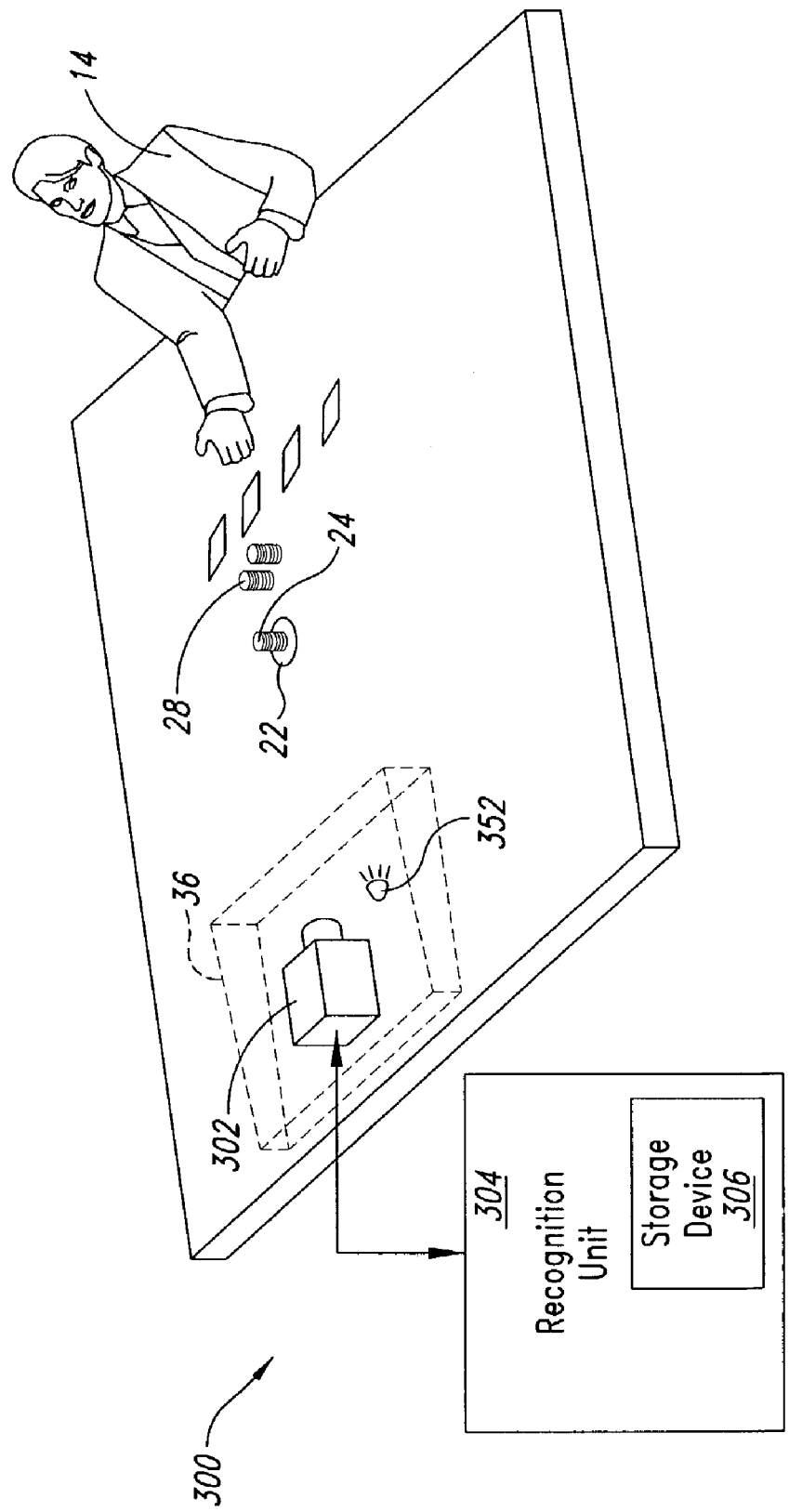
FIG. 3 is an elevational side view of a player, chip reserve, bet stack, bet circle, and gaming recognition system.

FIG. 3 shows a player 14, her chip reserve 28, her bet stack 24 in bet circle 22, and gaming recognition system 300 which provide context for description of the gaming recognition algorithm of FIG. 5. Gaming recognition system 300 includes image capture device 302 and recognition unit 304 and storage device 306. Image capture device 302 can be any of a variety of image capture devices, such as still cameras or sensors or motion cameras with suitable frame capture devices. Recognition unit 304 can be hardware, software, firmware, or some combination thereof, configured to perform appropriate portions of a gaming recognition algorithm such as that shown and described in relation to FIGS. 4 and 5. Typically, as shown in FIG. 1, image capture device is internal to chip tray 36. The recognition unit 304 may be internal to chip tray 36, or located externally, for example, tinder gaming table 10 or remotely therefrom. The recognition unit 304 may take the form of a standalone device, or may be implemented as part of a more comprehensive monitoring system. The recognition unit 304 may take the form of an appropriately programmed general-purpose computer or may take the form of a dedicated hardware and/or software device. The storage device 306 may take the form of any appropriately configured device for storing information, and typically contains one of various signal bearing media. Gaming recognition system 300, in an alternate embodiment, includes monochromatic light source 352.

Figure 4:
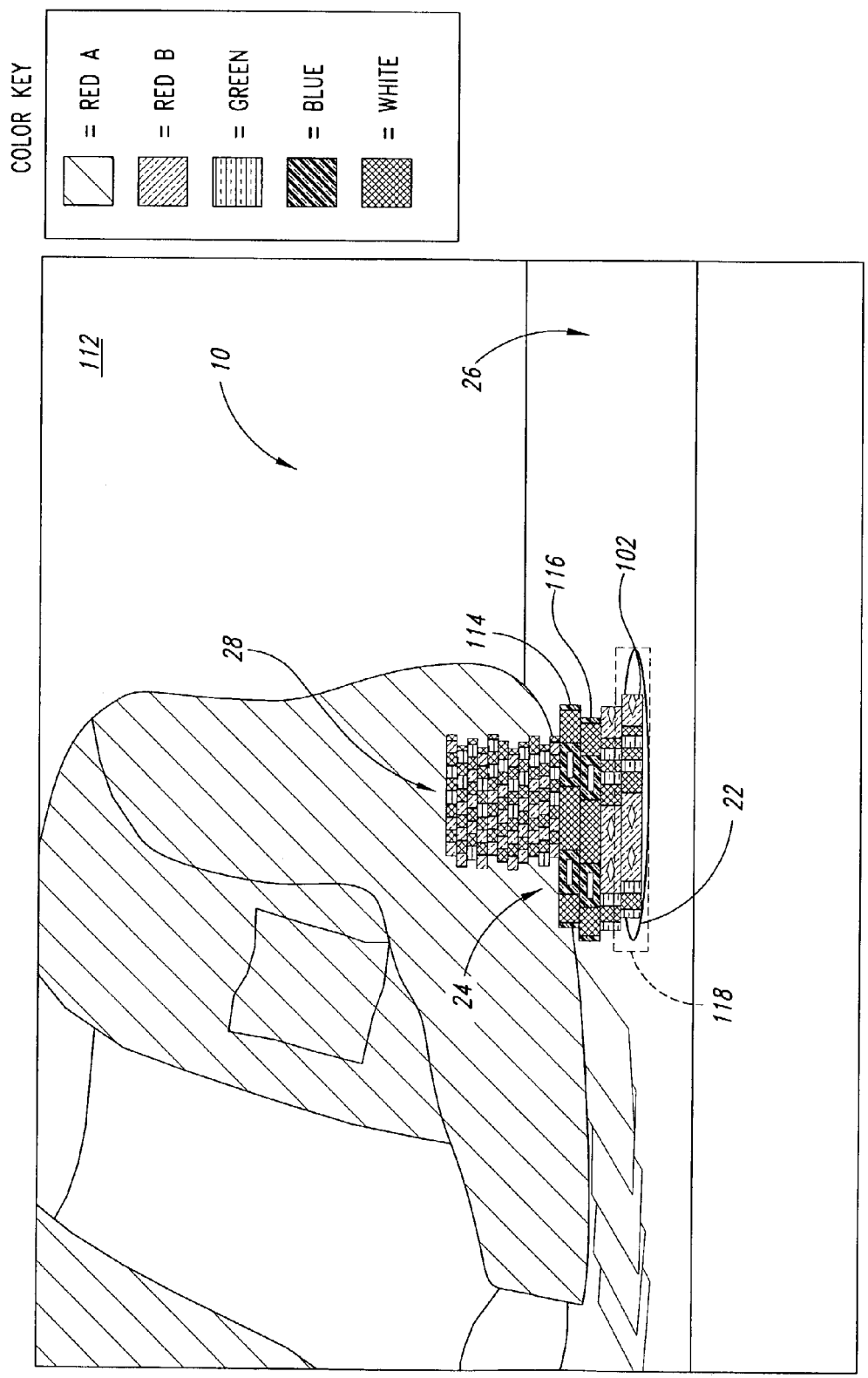
FIG. 4 is a representation of a pixilated image of bet stack, bet circle, chip reserve, and player.
Figure 5A:
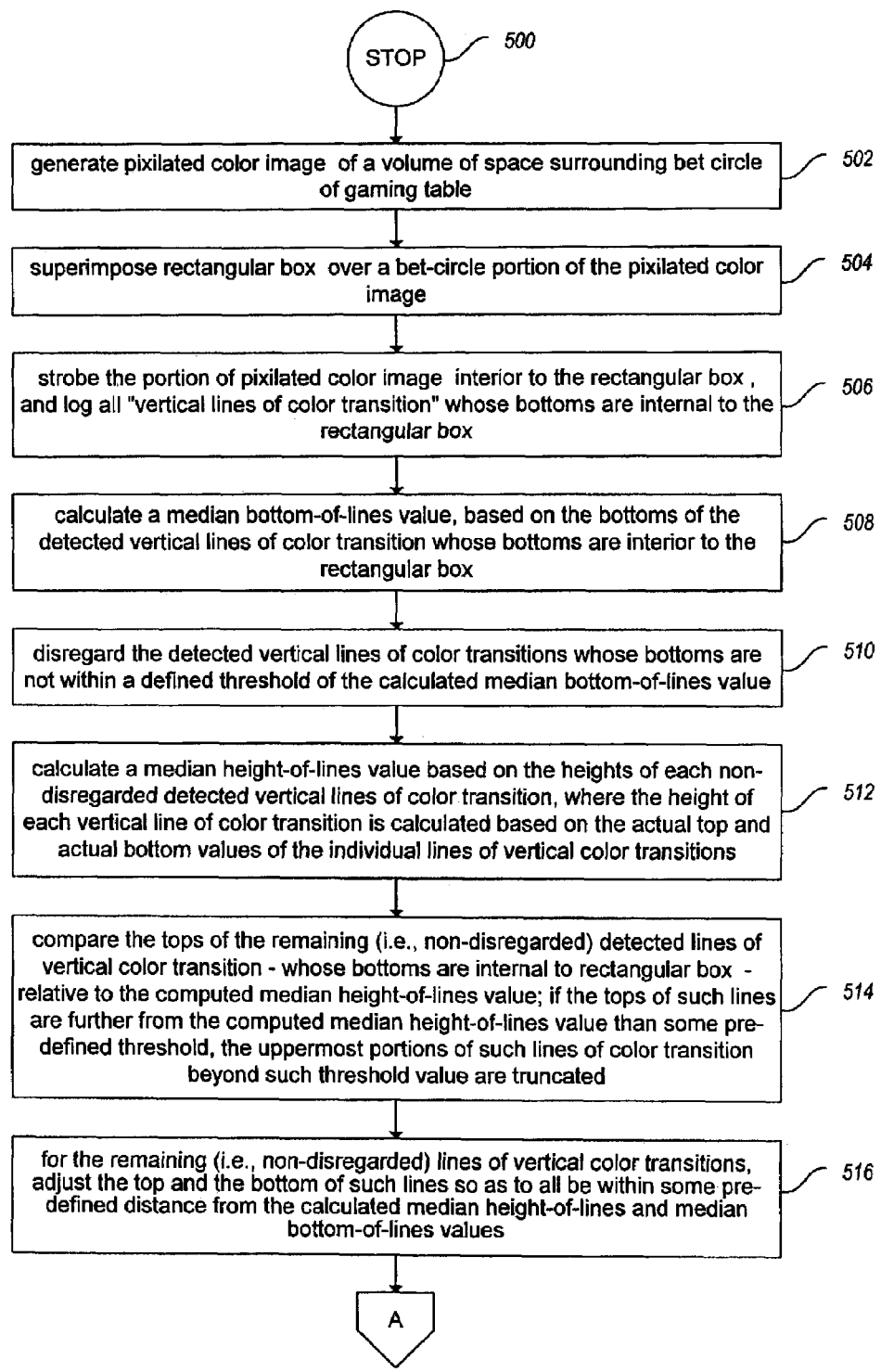
FIGS. 5A-5G constitute a high-level logic flowchart showing one example of a gaming recognition process in the context of the pixilated image of FIG. 4.
Figure 5B:
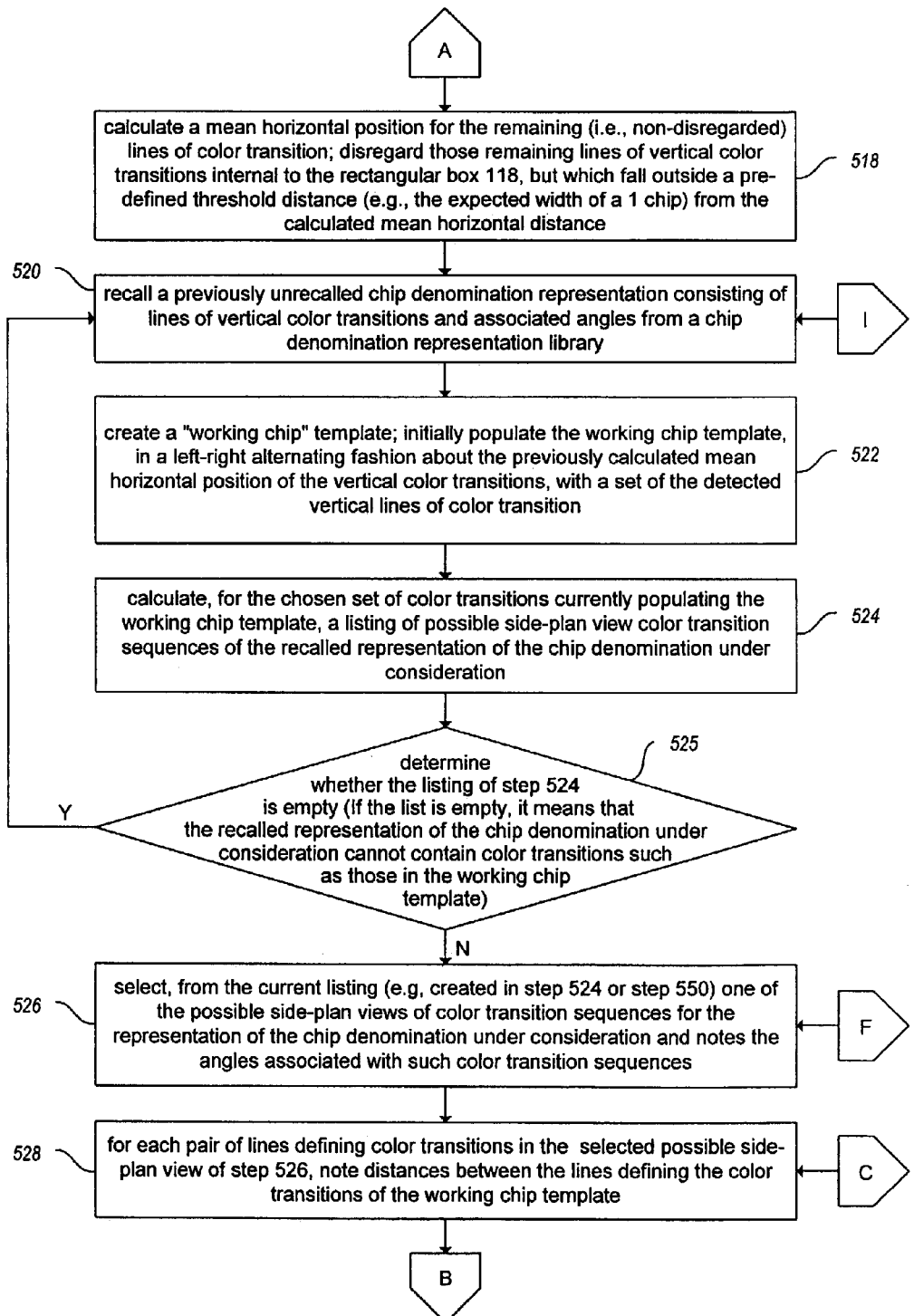
Figure 5C:
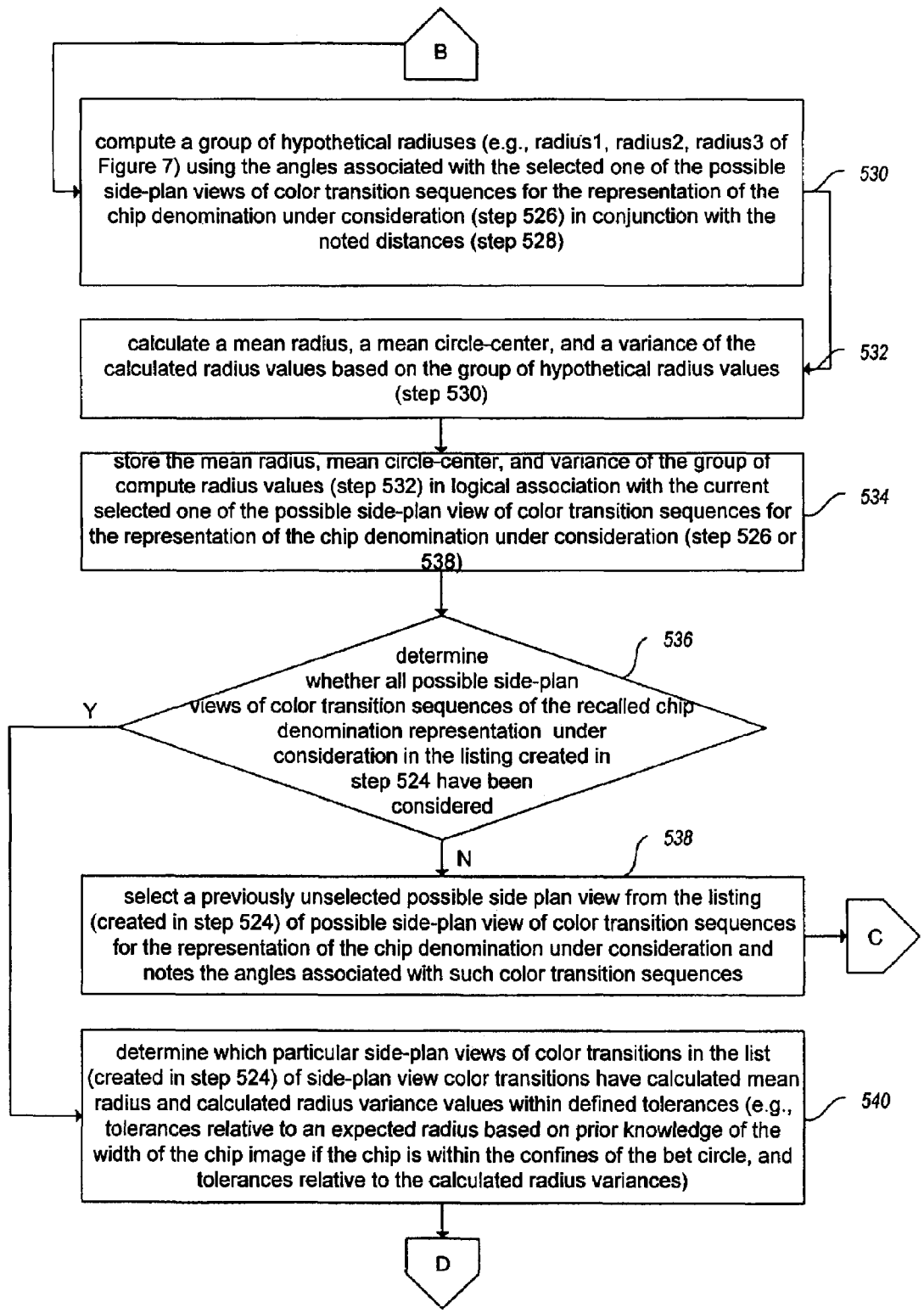
Figure 5D:
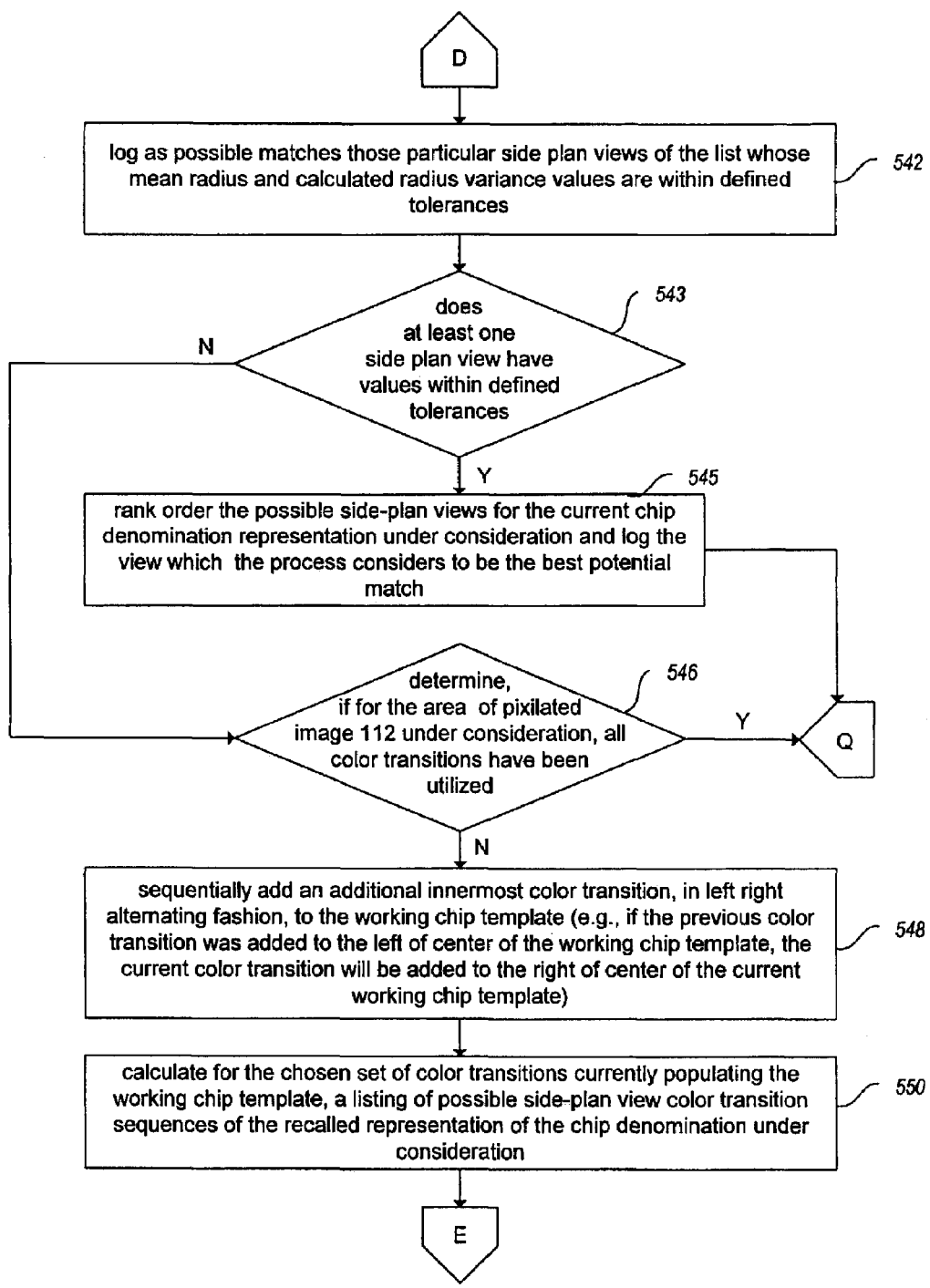
Figure 5E:
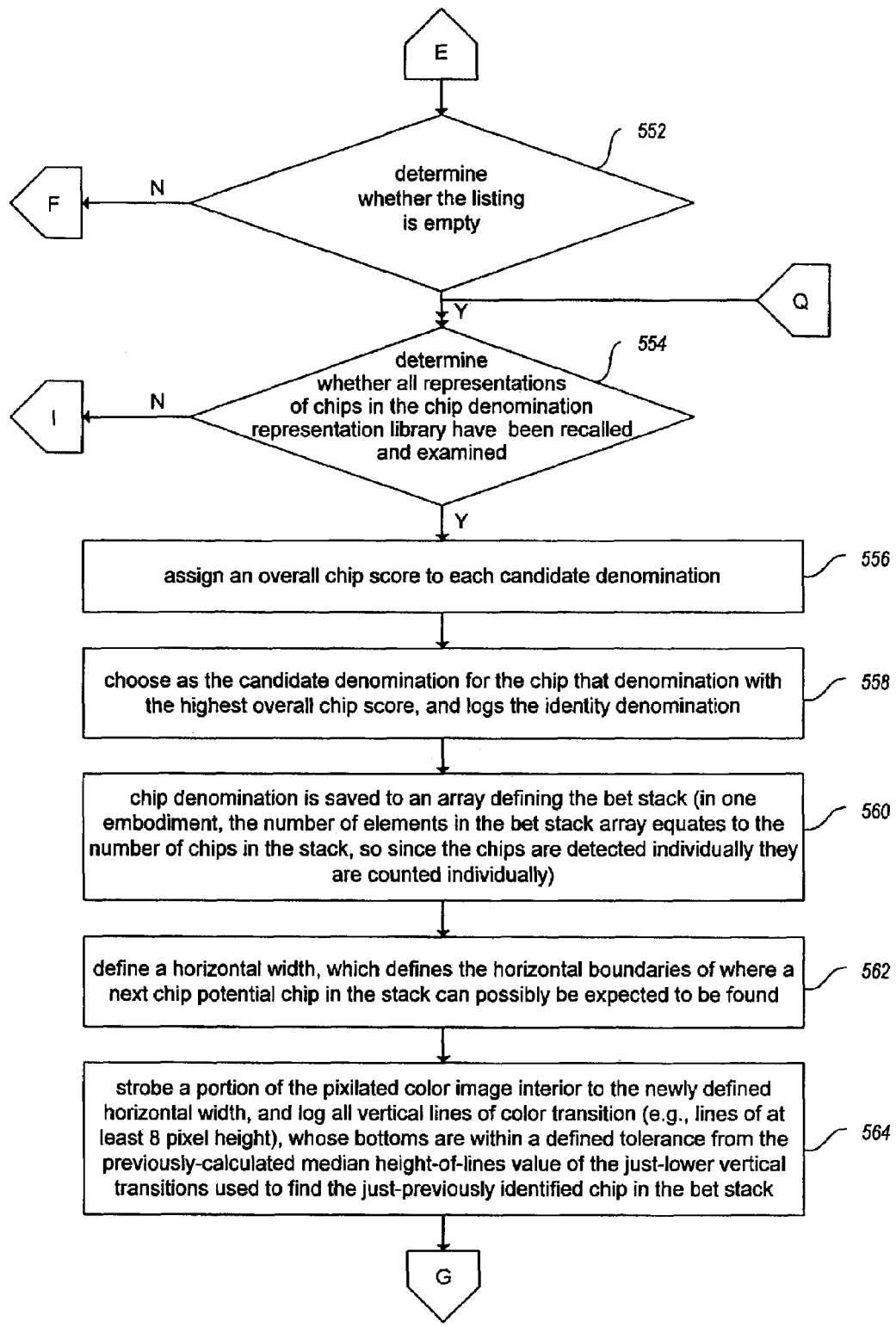
Figure 5F:
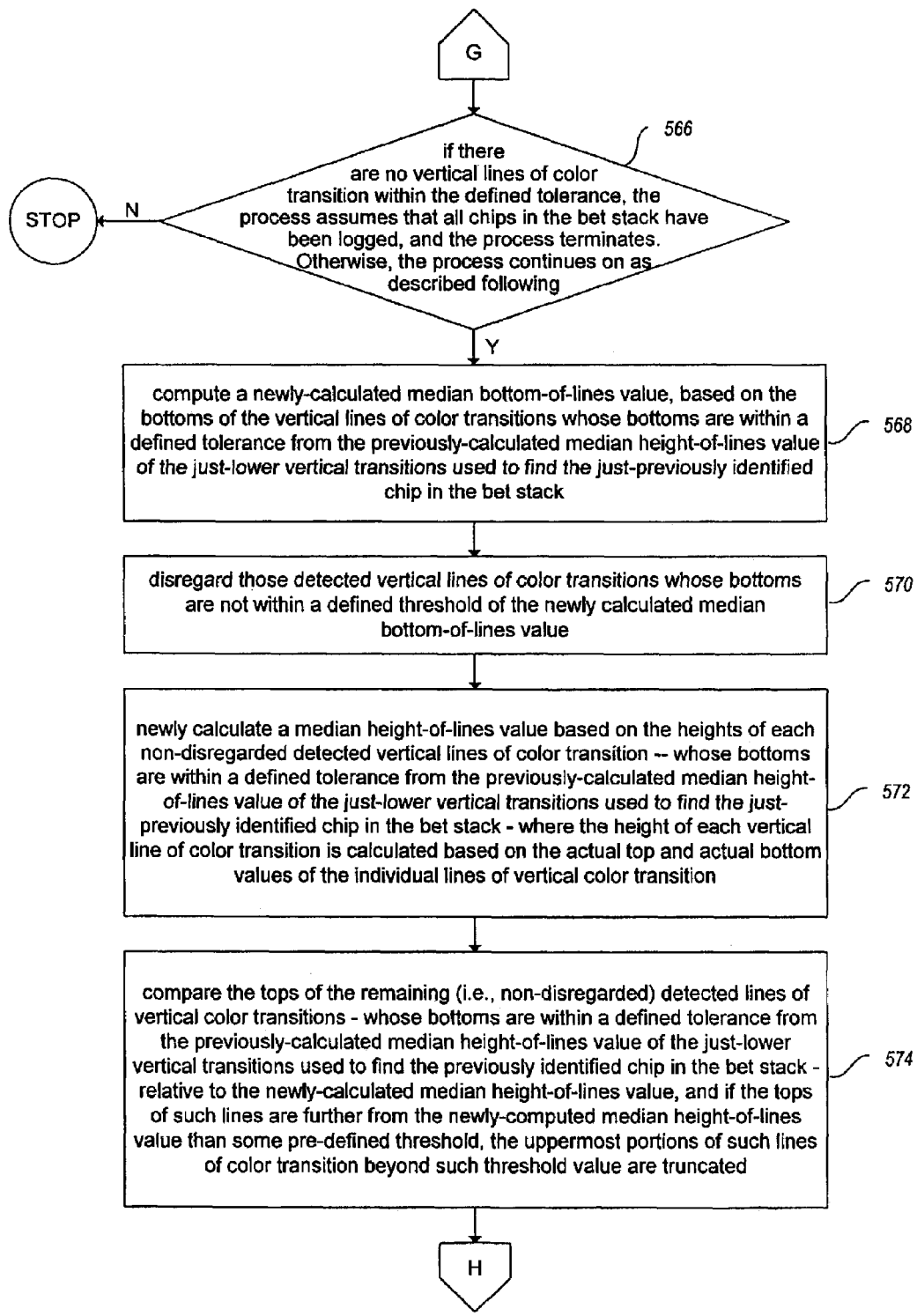
Figure 5G:
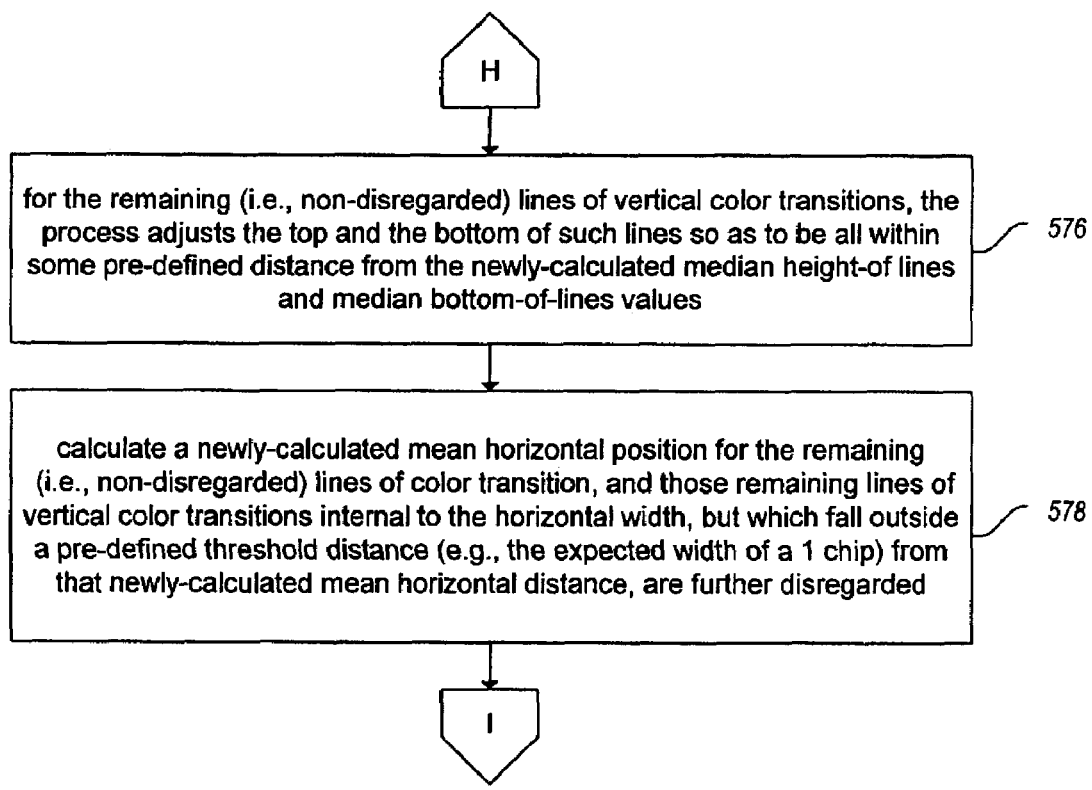

FIG. 4 is a representation of pixilated image 112 of bet stack 24, bet circle 22, chip reserve 28, and player 14 which provide context for description of the gaming recognition algorithm of FIG. 5. Pixilated image 112 is generated by image capture device 302 via any one of a number of techniques known in the art. The lowermost gaming chip 102 in bet stack 24 is substantially within the confines of bet circle 22. Bet circle 22 is inscribed upon surface 26 of a gaming table 10.

Pixilated image 112 has colors shown by the legend of FIG. 4. Player 14's jacket has a red color that is almost indistinguishable from the color red of the chips in chip reserve 28. The color red used in the chips of chip reserve 28 is exactly that of the color red in used in the chips of bet stack 24. Furthermore, the chips in chip reserve 28 are identical in appearance to the chips used in bet stack 24. As illustrated, the chips in bet stack 24 are irregularly stacked, although in some circumstances the chips in the bet stack 24 may be uniformly stacked. Any one of these conditions tends to cause prior art systems to incorrectly recognize the chips in bet stack 24. The presence of all these conditions creates a virtual certainty of error in prior art systems. The gaming recognition algorithm of FIG. 5 substantially reduces the likelihood of error, even if all of these conditions occur simultaneously.

FIGS. 5A-5G constitute a high-level logic flowchart showing one example of a gaming recognition process 500 in the context of pixilated image 112 of FIG. 4. The process 500 may be embodied in software, firmware, and/or hardware, for example as instructions, for execution by the recognition unit 304, and begins at step 501. In step 502, image capture device 302 generates pixilated color image 112 of a volume of space surrounding bet circle 22 of gaming table 10. Typically, image capture device 302 is positioned such that the captured image plane is approximately at a right angle to the surface 26 of gaming table 10.

In step 504, the recognition unit 304 superimposes rectangular box 118 over a portion of the pixilated color image 112. The position of rectangular box 118 defines, or is coordinated with, the location of the bet circle 22 in the image. The position of rectangular box 118 relative to pixilated color image 112 is based on pre-existing knowledge of images of gaming table 10 captured by image capture device 302. The rectangular box 118 is of height and width such that the process can determine from the position of the bottom of a chip's vertical lines of color transition whether or not the chip is substantially within bet circle 22. For example, an image of a chip spaced farther away from image capture device 302 would not have the bottom of its vertical color transitions in rectangular box 118. Likewise, an image of a chip spaced closer to image capture device 302 would not have the bottom of its vertical color transitions in the rectangular box 118.

In step 506, the recognition unit 304 strobes the portion of pixilated color image 112 interior to rectangular box 118, and logs all "vertical lines of color transition" whose bottoms are internal to the rectangular box 118. A "vertical line of color transition" is defined to be a vertical pixel boundary where to the left of the vertical boundary a number (e.g., 8) of substantially identical first-colored pixels in vertical alignment exist and where to the right of the vertical boundary a number (e.g., 8) of substantially identical second-colored (where the second color is different that the first color) pixels in vertical alignment exist. For example, 8 blue pixels in vertical alignment to the left of the vertical boundary, and 8 white pixels in vertical alignment to the right of the vertical boundary would constitute one vertical line of color transition, such as might be encompassed by the color bands of the top two chips 114, 116 in bet stack 24.

In step 508, the recognition unit 304 determines a median bottom-of-lines value, based on the bottoms of the detected vertical lines of color transition whose bottoms are interior to the rectangular box 118, for example by calculation. In step 510, the recognition unit 304 disregards the detected vertical lines of color transitions whose bottoms are not within a defined threshold of the calculated median bottom-of-lines value.

In step 512, the recognition unit 304 determines a median height-of-lines value based on the heights of each non-disregarded detected vertical lines of color transition. The height of each vertical line of color transition may be determined by calculation based on the actual top and actual bottom values of the individual lines of vertical color transition.

In step 514, the recognition unit 304 compares the tops of the remaining (i.e., non-disregarded) detected lines of vertical color transition—whose bottoms are internal to rectangular box 118—relative to the computed median height-of-lines value. If the tops of such lines are further from the determined median height-of-lines value than some pre-defined threshold, the process truncates, and saves the uppermost portions of such lines of color transition beyond such threshold value for subsequent processing.

In step 516, for the remaining (i.e., non-disregarded) lines of vertical color transition, the recognition unit 304 adjusts the top and the bottom of such lines so as to all be within some pre-defined distance from the determined median height-of-lines (step 512) and median bottom-of-lines (step 508) values.

In step 518, the recognition unit 304 determines a mean horizontal position for the remaining (i.e., non-disregarded) lines of color transition, for example, by calculation. The process disregards those remaining lines of vertical color transition that are internal to the rectangular box 118, but which fall outside a pre-defined threshold distance from the determined mean horizontal distance. In one implementation, the predefined threshold distance is the expected width of 1 chip.

Figure 6A:
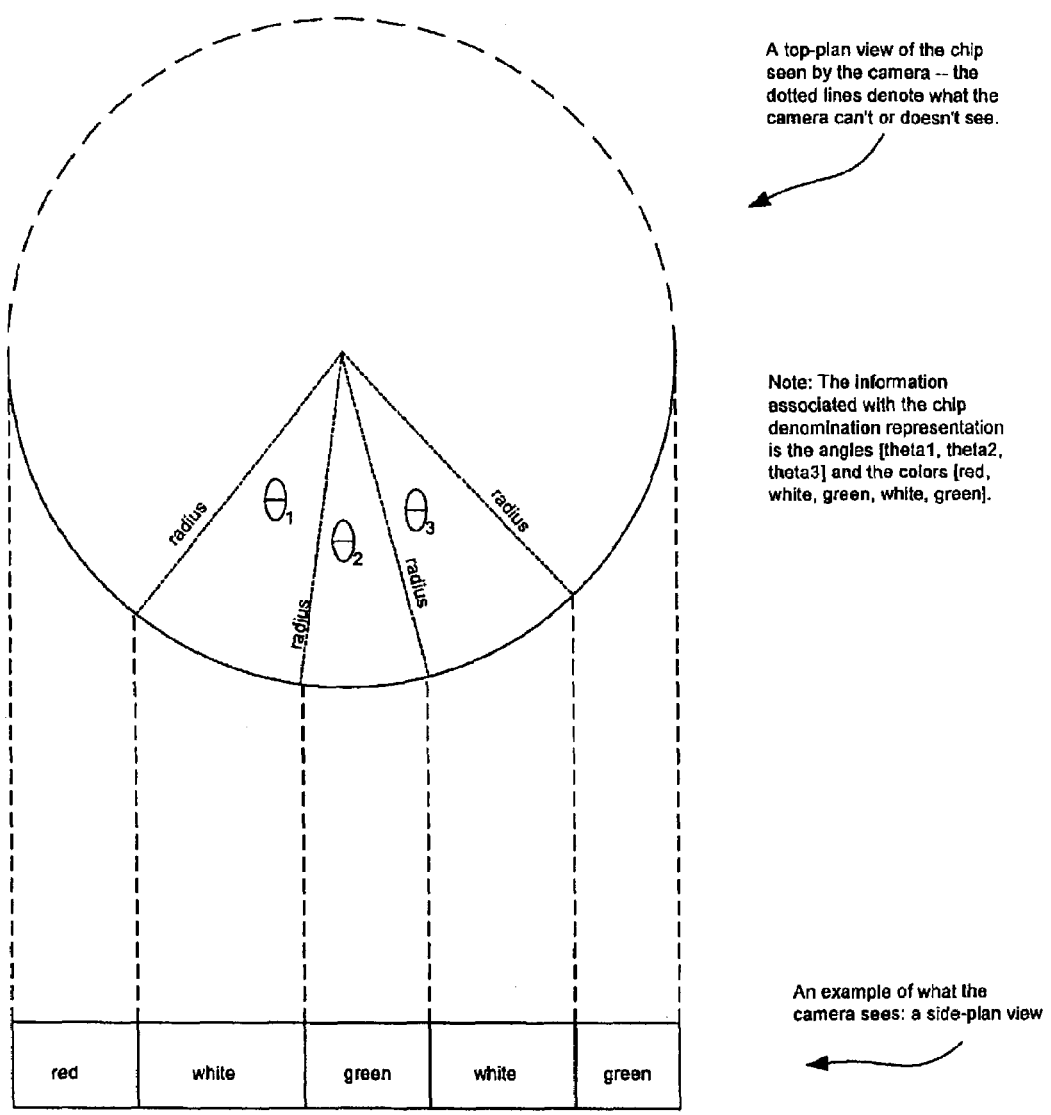
FIG. 6A shows how a chip denomination representation coordinates between a top-plan view of a chip having color-band angles measured relative to a center of the chip, and a side plan view of that chip as it appears to an image capture device as color bands of a chip.
Figure 6B:
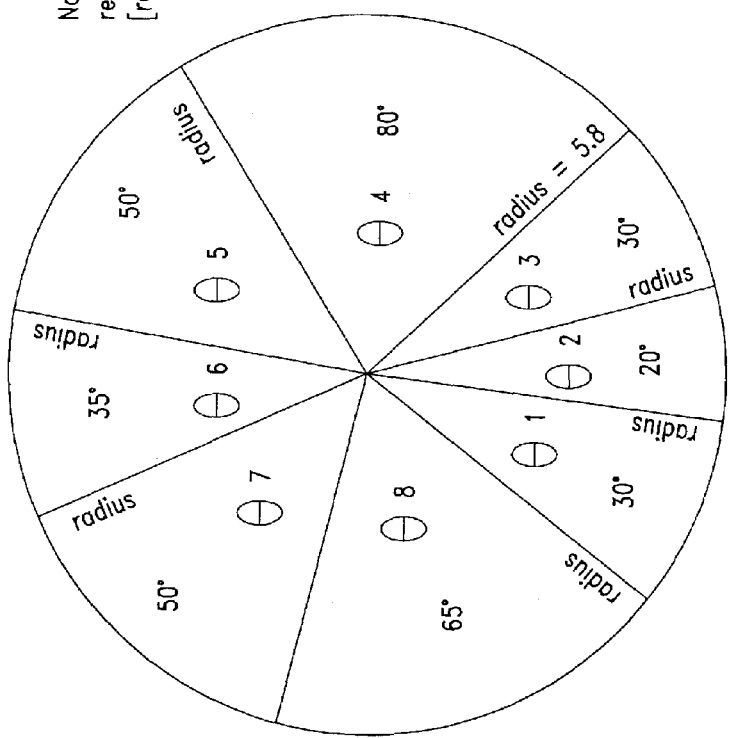
FIG. 6B shows how the chip denomination representation of FIG. 6A can be seen as "unwrapped" markings taken from about the perimeter of a chip.

In step 520, the recognition unit 304 recalls a previously unrecalled chip denomination representation consisting of lines of vertical color transition and associated angles (see, e.g., FIGS. 6A and 6B, below) from a chip denomination representation library. In one embodiment, a human operator has previously created the library by entering chip denomination representations of the color bands of the chip and the angles associated therewith. In another embodiment, a robot or a program has previously created the library by using images of the chip to perform geometrical calculations to derive the representations in the library. It is noteworthy that the creation of each chip denomination representation does not involve any statistical calculations whatsoever. As seen in FIGS. 6A and 6B below, the chip denomination representation used by the process is extremely unique in that it basically equates to "unwrapping" markings 46 about the perimeter of the chip, and subsequently storing colors and associated angles, measured from the center of the chip, sufficient to reconstruct the wrapping of the chip. One unique benefit gleaned from the chip denomination representations used by the process is that the colors and angles do not change with distance from image capture device 302. That is, even if a chip appears smaller in the image, the angles and associated colors remain the same, and hence this representation scheme allows the discernment of wagers in various bet circles at various distances from image capture device 302, such as secondary wager of bet stack 56 in bet circle 58 of FIG. 1.

In step 522, the recognition unit 304 creates a "working chip" template. The recognition unit 304 initially populates the working chip template, in a left-right alternating fashion about the previously calculated mean horizontal position of the vertical color transitions, with a set of the detected vertical lines of color transition. For example, with respect to chip 102 of FIG. 4, creating a working chip template having 3 vertical lines defining 4 color transitions, left to right, of red-white-green-white. As noted, at this point the recognition unit 304 has recalled the chip denomination representation from a chip denomination representation library. Typically, this recalled chip denomination representation carries with it the minimum number of lines of color transition which the system designer has determined are needed to identify the representation in side plan view (see, e.g., FIG. 6B). The recognition unit 304 uses this minimum number of lines of color transition to determine the number of innermost vertical color transitions which are initially used to populate the working chip template.

In step 524, the recognition unit 304 determines a listing of possible side-plan view color transition sequences of the recalled representation of the chip denomination under consideration for the chosen set of color transitions currently populating the working chip template, for example, by calculation. That is, knowing that the recalled chip denomination under consideration includes a series of color transitions arising from markings 46 that appear, in sequence, along perimeter 46 of a chip having the recalled denomination, the process knows that only a portion of the perimeter 46 of the chip can be seen by image capture device 302 at any particular time (e.g., FIG. 6A illustrates what image capture device 302 can see). Thus, for the recalled representation of the chip denomination under consideration, the recognition unit 304 goes through the color transitions of the representation of the chip denomination under consideration and determines the various different ways in which the chosen set of color transitions currently populating the working chip template (step 522) could possibly appear if the chip were rotated through many different orientations relative to image capture device 320. As a specific example, if the set of color transitions currently populating the working chip template were red-white, white-green, the process would calculate all possible side-plan view color transition sequences for the denomination—which could contain the red-white, white-green sequence—and which could appear in side-plan view if the chip were rotated through many different orientations. Another way to describe the foregoing operation is that the process attempts to wrap the unwrapped representation of the chip denomination under consideration around the working chip template to determine how well that wrapping matches with what can be seen by image capture device 302 (e.g., see FIGS. 10A-10E).

In step 525, the recognition unit 304 determines whether the listing determined in step 524 is empty. If the list is empty, it means that the recalled representation of the chip denomination under consideration cannot contain color transitions such as those in the working chip template. Consequently, the recognition unit 304 proceeds to step 520 and recalls a previously unrecalled representation of the chip denomination under consideration. If the list is not empty, the recognition unit 304 performs the actions of step 526 and subsequent steps.

As noted, in step 524 the recognition unit 304 creates a listing of possible side-plan views of color transition sequences of the recalled representation of the chip denomination under consideration. In step 526, the recognition unit 304 selects, from the current listing (e.g., created in step 524 or 550) one of the possible side-plan views of color transition sequences for the representation of the chip denomination under consideration and notes the angles associated with such color transition sequences. In step 528, for each pair of lines defining color transitions in the selected possible side-plan view of step 526, the recognition unit 304 determines distances between the lines defining the color transitions of the working chip template (e.g., as in method step 522, or in FIG. 7, below).

In step 530, the recognition unit 304 determines a group of hypothetical radiuses (e.g., radius1, radius2, radius3 of FIG. 7) using the angles associated with the selected one of the possible side-plan views of color transition sequences for the representation of the chip denomination under consideration (step 526) in conjunction with the noted distances (step 528).

In step 532, the recognition unit 304 determines a mean radius, a mean circle-center, and a variance of the determined radius values based on the group of hypothetical radius values of step 530. In step 534, the recognition unit 304 stores the mean radius, the mean circle-center, and the variance of the determined radius values in logical association with the current selected one of the possible side-plan view of color transition sequences for the representation of the chip denomination under consideration (e.g., that of step 526 or 538).

In step 536, the recognition unit 304 determines whether all possible side-plan views of color transition sequences of the recalled chip denomination representation under consideration in the listing created in step 524 have been considered. If not all of the possible side-plan views in the listing created in step 524 have been considered, in step 538 the recognition unit 304 selects a previously unselected possible side plan view from the listing (created in step 524) of possible side-plan view of color transition sequences for the representation of the chip denomination under consideration, and notes the angles associated with such color transitions. Thereafter, the recognition unit 304 engages in step 528 (e.g. determined distances between lines) and subsequent steps as indicated in the flow chart.

If all of the possible side-plan views in the listing created in step 524 have been considered, at this point the recognition unit 304 has a determined mean circle-center, a determined variance of the radius values, and a determined mean radius associated with each possible side-plan view in the listing of step 524. As illustrated in FIG. 8, these values can be visually viewed as analogous to constructing as composite chip for each of the possible side-plan views in the listing created in step 524.

In step 540, the recognition unit 304 determines which particular side-plan views of color transitions in the list have determined mean radius and radius variance values within defined tolerances. The defined tolerances are tolerances relative to an expected radius based on prior knowledge of the width of the chip image if the chip is within the confines of the bet circle, and tolerances relative to the determined radius variances. In step 542, the recognition unit 304 logs as possible matches those particular side-plan views of color transitions in the list whose values are within defined tolerances.

In step 543, the recognition unit 304 checks to see if at least one side plan view has values within the defined tolerances. If at least one side plan view has values with defined tolerances, the recognition unit 304 takes action as shown in step 545. If no side plan view has values within defined tolerances, the recognition unit 304 takes action as shown in step 546.

In step 545, if only one side-plan view for the current chip denomination representation was found to have values within tolerances, that side-plan view is used. However, if more than one side plan view for the current chip denomination representation was found, the recognition unit 304 logs as the best possible side-plan view for the denomination that view which has the lowest determined radius variance value for the chip denomination representation under consideration. Subsequently, the mean circle-center value, determined radius variance value, the number of transitions used, and the determined mean radius value for the side plan view ultimately deemed the best for the current chip denomination representation under consideration are logged by the recognition unit 304. In other words, the recognition unit 304 rank orders the possible side-plan views for the current chip denomination representation under consideration and logs the view that the recognition unit 304 considers to be the best potential match.

If none of the determined radiuses and determined radius variances is within defined tolerances, the set of chosen innermost color transitions of the working chip (step 522) has failed to identify the current chip denomination representation as a potential match for the chip. Accordingly, in step 546 the recognition unit 304 determines, if for the area of pixilated image 112 under consideration, all color transitions have been utilized. If all color transitions have not been utilized, in step 548 the recognition unit 304 sequentially adds an additional innermost color transition, in left right alternating fashion to the working chip template (e.g., if the previous color transition was added to the left of center of the working chip template, the current color transition will be added to the right of center of the current working chip template).

In step 550, the recognition unit 304 determines a listing of possible side-plan view color transition sequences of the recalled representation of the chip denomination under consideration for the chosen set of color transitions currently populating the working chip template. In step 552, the recognition unit 304 determines whether the listing of step 550 is empty. If the list is empty, it means that the recalled representation of the chip denomination under consideration does not contain color transitions such as those currently in the working chip template. Consequently, it is known that the representation of the chip denomination currently under consideration does not match the detected chip. If the list is not empty, the recognition unit 304 takes actions as indicated in step 526 and selects one of the possible side plan views of the chip denomination representation under consideration.

In step 554, the recognition unit 304 determines whether all representation of chips in the chip denomination-representation library have been recalled and examined. If all representations of chips in the library have not been recalled, the recognition unit 304 takes action as recited in step 520 (e.g., recalls a previously unrecalled chip denomination representation consisting of lines of vertical color transition and associated angles (see, e.g., FIGS. 6A and 6B, below) from a chip denomination representation library) and subsequent steps. However, if all representations of chips in the library have been recalled, the recognition unit 304 determines which of the possible candidate denominations equate to the detected chip.

In step 556, the recognition unit 304 assigns an overall chip score to each candidate denomination. In one embodiment, the overall chip score is based upon (a) how closely each candidate denomination's determined mean radius matches an expected radius, (b) a determined color score, and (c) the number of vertical color transitions used to determine the candidate solution denomination. In step 558, the recognition unit 304 selects as the candidate denomination for the chip, the denomination with the highest overall chip score, and logs the identity denomination.

At this point, the recognition unit 304 has determined a denomination of the chip. Consequently, in step 560, the chip denomination is saved to an array defining the bet stack. In one embodiment, the number of elements in the bet stack array equates to the number of chips in the stack, so since the chips are detected individually they are counted individually.

There may be more chips in the bet stack. Thus, in step 562, the recognition unit 304 defines a horizontal width, which defines the horizontal boundaries of where a next chip potential chip in the stack can possibly be expected to be found. In one embodiment, this horizontal width is centered on the determined mean circle-center value of the just-previously found chip, where the horizontal width has width 2× the expected width of how a chip would appear within the bet circle. This 2× width allows the processes to catch skewed chips in stack, such as shown above in FIG. 4.

In step 564, the recognition unit 304 strobes a portion of the pixilated color image 112 interior to the newly defined horizontal width, and logs all vertical lines of color transition (e.g., lines of at least 8 pixel height), whose bottoms are within a defined tolerance from the previously-determined median height-of-lines value of the just-lower vertical transitions used to find the just-previously identified chip in the bet stack.

In step 566, if there are no vertical lines of color transition within the defined tolerance, the recognition unit 304 assumes that all chips in the bet stack have been logged, and the process 500 terminates. Otherwise, the process 500 continues on as described below.

In step 568, the recognition unit 304 computes a newly-calculated median bottom-of-lines value, based on the bottoms of the vertical lines of color transitions whose bottoms are within a defined tolerance from the previously-calculated median height-of-lines value of the just-lower vertical transitions used to find the just-previously identified chip in the bet stack.

In step 570, the recognition unit 304 disregards those detected vertical lines of color transitions whose bottoms are not within a defined threshold of the newly calculated median bottom-of-lines value.

In step 572, the recognition unit 304 newly determines a median height-of-lines value based on the heights of each non-disregarded detected vertical lines of color transition—whose bottoms are within a defined tolerance from the previously-determined median height-of-lines value of the just-lower vertical transitions used to find the just-previously identified chip in the bet stack (e.g., a median height-of-lines value relative to a median bottom-of-lines value)—where the height of each vertical line of color transition is calculated based on the actual top and actual bottom values of the individual lines of vertical color transition.

In step 574, the recognition unit 304 compares the tops of the remaining (i.e., non-disregarded) detected lines of vertical color transition—whose bottoms are within a defined tolerance from the previously-determined median height-of-lines value of the just-lower vertical transitions used to find the previously identified chip in the bet stack (e.g., a median height-of-lines value relative to a median bottom-of-lines value)—relative to the newly-calculated median height-of-lines value. If the tops of such lines are further from the newly-determined median height-of-lines value than some pre-defined threshold, the uppermost portions of such lines of color transition beyond such threshold value are truncated by the process.

In step 576, for the remaining (i.e., non-disregarded) lines of vertical color transition, the recognition unit 304 adjusts the top and the bottom of such lines so as to be all within some pre-defined distance from the newly-calculated median height-of-lines and median bottom-of-lines values.

In step 578, the recognition unit 304 determines a new mean horizontal position for the remaining (i.e., non-disregarded) lines of color transition, for example by calculation. The recognition unit 304 disregards those remaining lines of vertical color transition internal to the horizontal width, but which fall outside a pre-defined threshold distance (e.g., the expected width of a 1 chip) from that newly-calculated mean horizontal distance.

Thereafter, the foregoing steps, beginning with step 520, where the recognition unit 304 recalls a previously unrecalled chip denomination representation consisting of lines of vertical color transition and associated angles from a chip denomination representation library, are repeated.

As can be seen from the above, the process 500 of FIG. 5 continues until no further candidate chips for the bet stack are found, at which point the denomination and arrangement of chips in the bet stack are known. As has been described above, the count of the chips in the bet stack is associated with the number of elements in an array, where each element represents a detected chip. Hence since the chips in the bet stack are identified and logged one at a time, it follows that the chips are counted one-at-a-time. Consequently, the process provides the denominations, the positions, and the count of the chips in the bet stack 22.

FIG. 6A shows how a chip denomination representation coordinates between a top-plan view of a chip having color-band angles measured about a center of the chip, and a side plan view of that chip as it appears to image capture device 302. With respect to the side plan view of the chip detected by image capture device 302, the process does not assume that the leftmost and rightmost color bands have associated angles. The reason why is that, as shown in FIG. 6A, it is possible that the leftmost and rightmost color bands wrap to the back of the chip.

FIG. 6B shows how the chip denomination representation of FIG. 6A can be seen as "unwrapped" markings taken from about the perimeter of a chip. As shown, each color band in the unwrapped marking has an associated angle theta, and a pre-designated initial number of color transitions FIG. 7 shows an example of determining or noting of distances between color transitions that define color bands. The example notes three distances d1, d2, and d3. Distance d1 is the distance between the second leftmost color transition (from red to white) and the next rightward color transition (from white to green). Distance d2 picks up substantially where distance d1 ends, and is the distance between the color transition forming the end of distance d1 (from white to green) and the next rightward color transition (from green to white). Distance d3 picks up substantially where distance d2 ends and the next rightward color transition (from white to green).

FIG. 8 shows an example of how the process uses the observed distances d1, d2, and d3 in isolation, along with the side plan views of the chip denomination representation under consideration, to calculate hypothetical radius values and hypothetical circle center values. The example of FIG. 8 can basically be viewed as a series of questions which the recognition unit 304 executing the process 500 asks itself. For example, since the chip representation denomination carries the angle and color transitions (see, e.g., FIGS. 6A and 6B, above), each distance d can be treated individually as follows: "if observed distance d1 were actually a projection of the chip denomination under consideration, and the color segment between the lines defining distance d1 had the associated angle $\Theta_1$, what would be the hypothetical radius1 of a circle as it appeared in the image, and where would the hypothetical circle-center1 be located?" Thereafter, the next distance d2 for the color transitions under examination would be used, and a radius2 value and circle-center2 value calculated; thereafter the next distance d3, could be used to calculate a radius3 value, and a circle-center3 value calculated (see, e.g., FIG. 9, following). (While the visual examples herein substantially accurately depict the overall theory used to derive the radiuses and circle-center values, in one implementation, the process 500 logic is typically achieved numerically. This numerical process 500 calculates the radiuses and circle-center values via an iterative approach based on numerical computation techniques, and hence does not lend itself well to visual depiction. Specifically, for each possible pair of vertical color transactions (e.g., distances associated therewith) the process 500 iterates the value $\theta_0$ (i.e., a hypothesized angle, which is used to approximate different rotational orientations of the chip). The iteration ranges between 0-180 degrees to get a series of radius values for each possible $\theta_0$ for each possible pair of vertical color transitions. The process 500 subsequently determines which value of $\theta_0$ produced the radius value with the minimum variance. Once the process 500 has determined this radius with minimum variance, the process 500 then recalls the value of $\theta_0$ that produced such radius and subsequently determines the mean circle-center value for each possible color transition pair and then averages to get the mean center value.

Figure 9:
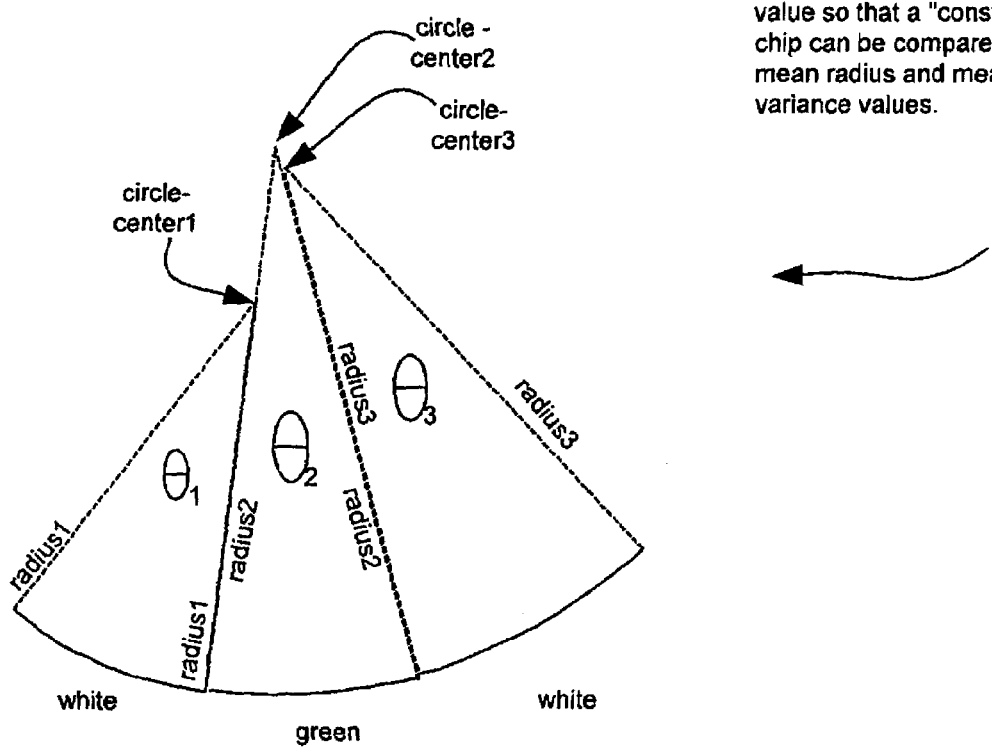
FIG. 9 shows pictographically that the individually calculated various hypothetical radiuses and circle centers of FIG. 8 are not likely to match up with each other exactly.

FIG. 9 shows pictographically that the individually calculated various hypothetical radiuses and, circle centers of FIG. 8 are not likely to match up with each other exactly. Hence, the process 500 uses the individually determined hypothetical radiuses and circle centers to create a "constructed" chip having a mean circle center, a mean radius value, and a circle center variance value which can be used to compare against known, prestored, mean radius and mean variance values.

Figure 10A:
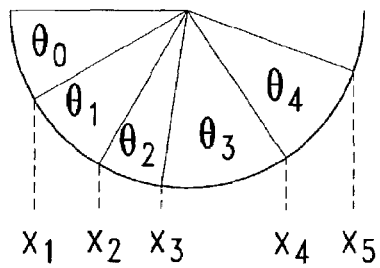
FIGS. 10A-10E show an example of one scheme that may be used to determine whether a chip denomination representation under consideration is a good match for a chip that can be seen by the image capture device.

FIGS. 10A-10E show an example of one scheme that may be used to determine whether a chip denomination representation under consideration is a good match for a chip that can be seen by image capture device 302. FIG. 10A shows a top-plan view in coordination with the positions (e.g. $x_1$, $x_2$, $x_3$, $x_4$, $x_5$, etc.) of color transitions of a chip that can be seen by image capture device 302 in side plan view, such as was shown in FIG. 6A. As noted in relation to FIG. 6A, the leftmost and rightmost color transitions are often not used because it is possible that the colors at the outermost viewable portions of the perimeter of the chip actually "wrap" to the back of the chip such as shown in FIG. 6A. In FIG. 10A, $x_i$ is the horizontal position of a VCT as seen from the camera, and $\theta_i$, is the angle between VCTs from the candidate chip denomination representation under consideration, where i=1, 2, 3, etc. The angle $\theta_0$ is unknown, but indicates the actual physical orientation of the chip in the bet circle.

FIGS. 10B-10E shows a series of relations between vertical color transitions that can be seen by image capture device 302, the angle $\theta_0$, and an assumed circle center and assumed radius value.

Figure 10B:
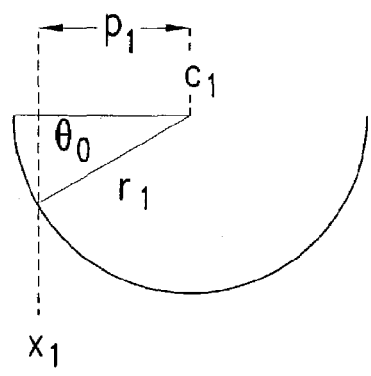

FIG. 10B can be used to establish a mathematical relation between the first vertical color transition $x_1$, an assumed circle center $c_1$, an assumed radius value $r_1$, and a projection $p_1$ onto the baseline angle against an angle $\theta_0$ as follows:

$$p_1 = c_1 - x_1 \quad \text{(C)}$$

$$\therefore p_1 = r_1 \cos \theta_0 \quad \text{(B)}$$

Figure 10C:
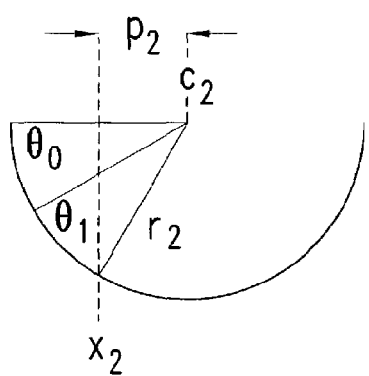

FIG. 10C can be used to establish a mathematical relation between the second vertical color transition $x_2$, an assumed circle center $c_2$, an assumed radius value $r_2$, and a projection $p_2$ onto the baseline angle against an angle $\theta_0$ as follows:

$$p_2 = c_2 - x_2$$

$$\therefore p_2 = r_2 \cos(\theta_0 + \theta_1)$$

Figure 10D:
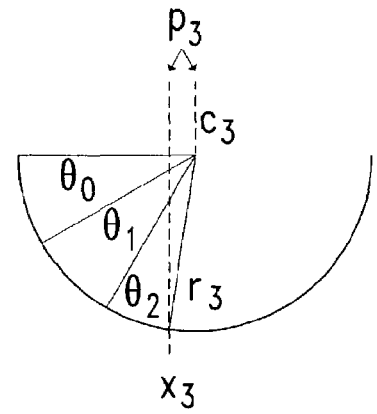

FIG. 10D can be used to establish a mathematical relation between the third vertical color transition $x_3$, an assumed circle center $c_3$, an assumed radius value $r_3$, and a projection $p_3$ onto the baseline angle against an angle $\theta_0$ as follows:

$$p_3 = c_3 - x_3$$

$$\therefore p_3 = r_3 \cos(\theta_0 + \theta_1 + \theta_2)$$

Figure 10E:
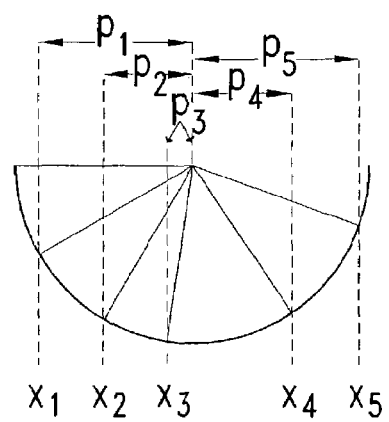

FIG. 10E can be used to establish a generalized mathematical relations between the visible vertical color transitions $x_i$, an assumed circle center $c_i$, assumed radius values $r_i$ and projections $p_i$ where i=1, 2, 3, . . . etc. This relation can be expressed as follows:

$$\text{In general } p_i = c_i - x_i \text{ and } p_i = r_i * \cos\left(\sum_{j=0}^{i-1} \theta_j\right) \quad (A)$$

Note that, for m and n being any legitimate delimiters of color transitions and projections:

$$x_m - x_n = p_m - p_n$$

substituting formula A into the foregoing relation yields $$x_m - x_n = \left(r_m * \cos\left(\sum_{j=0}^{m-1} \theta_j\right)\right) - \left(r_n * \cos\left(\sum_{j=0}^{n-1} \theta_j\right)\right)$$

Now assume that VCTs $x_m$, $x_n$ come from the same chip (it is possible that the VCTs are not from the same chip, such as a VCT in the background), and the denomination currently under consideration is correct. This would imply that there is a common radius, which is designated herein by the notation: $R_{m,n}$, meant to indicate that the radius value should be the same, or nearly so, no matter what (legitimate) values m and n take on. Since there is a common radius, we know $$\therefore r_m = R_{m,n}, r_n = R_{m,n}.$$

Substituting this common radius into the general relation set forth above yields $$x_m - x_n = \left(R_{m,n} * \cos\left(\sum_{j=0}^{m-1} \theta_j\right)\right) - \left(R_{m,n} * \cos\left(\sum_{j=0}^{n-1} \theta_j\right)\right).$$

Rearranging terms yields $$R_{m,n} = \frac{x_m - x_n}{\cos\left(\sum_{j=0}^{m-1} \theta_j\right) - \cos\left(\sum_{j=0}^{n-1} \theta_j\right)}$$

Now, if the assumptions that the VCTs come from the same chip, and the denomination under consideration, are correct, then all $R_{m,n}$ from all possible VCT pairs from the VCT pair set $(x, x_2, x_3, \ldots)$ must be the substantially the same, i.e., $R_{1,2} = R_{1,3} = R_{2,3} = \ldots$ To verify that all $R_{m,n}$ from all possible VCT pairs from the VCT pair set $(X, x_2, x_3, \ldots)$ are substantially the same, the process 500 computes all such $R_{m,n}$ for various values of $\theta_0$ and validates that they are similar. In one implementation, as noted above, the process 500 computes $R_{m,n}$ by an iterative numerical approach, since $\theta_0$ is unknown. In the iterative approach, the process 500 (a) selects a particular $\theta_0$ angle, (b) creates a group of calculated radius values by using the selected particular $\theta_0$ angle and the $R_{m,n}$ formula to compute substantially every possible m,n pair of VCTs, (c) computes variance of the group of radiuses created in (b), and (d) if the variance of (c) is the lowest computed variance so far, that lowest computed variance is stored in association with the θ0 which resulted in such lowest computed variance. In one implementation, this iteration is done over all possible values of $\theta_0$ from 0° to 90°.

Subsequent to the process 500 iterating over all possible values of $\theta_0$ from 0° to 90°, the process has the lowest calculated variance for the chip denomination representation under consideration for an iteratively chosen value of $\theta_0$. This variance of all $R_{m,n}$ will be less than a predefined threshold (chosen by the system designer as indicative of an acceptable match) if both of the following conditions are satisfied:

(1) the stored value of $\theta_0$ correctly indicates the orientation of the chip;

(2) the current denomination under consideration is a potential correct match for the chip.

Once the process 500 has done the foregoing, the process 500 has a single radius R calculated as the average radius based on the group of radiuses that has the best variance. From this average radius, the process 500 can compute the circle center C as follows:

from formula:

$$p_1 = r_1 \cos \theta_0 \quad (B)$$

$$p_1 = c_1 - x_1 \quad (C)$$

$$\therefore C_1 = x_1 + r_1 \cos \theta_0$$

or $C = x_1 + R \cos \theta_0$

Thus, for the current denomination under consideration, the process 500 now has an average radius, circle center, and variance such as discussed above in relation to the flowchart of FIG. 5.

The foregoing described subject matter works well for existing chips, and is uniquely valuable in that it can be used with pre-existing chips. However, in another embodiment a monochromatic light source 354 (e.g., 880 nm infrared) is positioned proximate to image capture device 302 and aimed such that the monochromatic light source bounces directly off chip stack 24 and into the lens of image capture device 302. In this embodiment, the chips are encoded with infrared reflective and/or absorbant material that actually either fluoresces and/or absorbs light at the monochromatic wavelength from the source illumination. This allows the image capture device 302, with an optical band pass filter selected at the wavelength of the fluoresced material, to see only the code. The background ambient light as well as the reflective light source light from the absorbed coded area are substantially eliminated.

The fact that the monochromatic light source is infrared means that its presence is not generally detectable by players 14-16.

In the embodiment using monochromatic light source 354, the algorithm described herein is used in a substantially unchanged fashion. The reason for this is that since monochromatic light is being used, the red, green, and blue color values end up having substantially the same values.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which aspects of processes and/or systems described herein can be effected (e.g., hardware, software, and/or firmware), and that the preferred vehicle will vary with the context in which the processes and/or systems are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which aspects of the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into systems. That is, the devices and/or processes described herein can be integrated into a system via a reasonable amount of experimentation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g. "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

This application also incorporates by reference in their entireties any and all materials incorporated by reference into the foregoing referenced application; such materials include at least the subject matter of the currently co-pending U.S. patent application Ser. No. 09/474,858, filed Dec. 30, 1999, entitled, METHOD AND APPARATUS FOR MONITORING CASINOS AND GAMING, naming Richard Soltys and Richard Huizinga as inventors, and the subject matter of the U.S. Provisional Patent Application No. 60/130,368, filed Apr. 21, 1999, entitled, TRACKING SYSTEM FOR GAMES OF CHANCE, naming Richard Soltys and Richard Huizinga as inventors which was previously incorporated by reference into the currently co-pending U.S. patent application Ser. No. 09/474,858.

The invention claimed is:

1. A method for use with identifying wagers in gaming comprising:
   acquiring an image of at least a portion of a gaming table having a bet circle;
   selecting an area of the image proximate to the bet circle;
   detecting color transitions at least partially in the area;
   conforming the color transitions to the area to create area-conformed color transitions;
   constructing a working chip template from the area-conformed color transitions;
   recalling a first chip denomination representation from a chip denomination representation library, the first chip denomination representation having at least one angle associated with at least one color transition;
   applying the first chip denomination representation against the working chip template; and
   calculating a first chip score responsive to said applying the first chip denomination.

2. The method of claim 1 wherein detecting color transitions comprises:
   detecting a first color pixel adjacent to a second color pixel.

3. The method of claim 1 wherein the at least one angle associated with at least one color transition comprises:
   a single angle measured relative to at least one of a preceding angle associated with a preceding line of color transition and a succeeding angle associated with a succeeding line of color transition.

4. The method of claim 1 wherein the first chip denomination representation having at least one angle associated with at least one color transition comprises:
   a sequential listing of lines of color transition on a cylindrical surface; and
   a listing of angles demarked by the lines of color transition on the cylindrical surface, the angles measured from the center of the cylinder formed by the cylindrical surface.

5. The method of claim 1 wherein said conforming the color transitions to the area to create area-conformed color transitions comprises:
   determining a median bottom-of-lines value based on one or more bottom positions of any color transitions in the area; and
   fitting any color transitions in the area to the median bottom-of-lines value.

6. The method of claim 5 wherein said fitting any color transitions in the area to the median bottom-of-lines value comprises:
   removing a color transition whose bottom is not within a defined threshold of the calculated median bottom-of-lines value.

7. The method of claim 5 wherein said fitting any color transitions in the area to the median bottom-of-lines value comprises:
   adjusting a bottom of a color transition in the area to be within a predefined distance from the median bottom-of-lines value.

8. The method of claim 5, further comprising:
   determining a median height-of-lines value based on the one or more color transitions in the area; and
   sizing the one or more color transitions to the median height-of-lines value.

9. The method of claim 8 wherein said sizing the one or more color transitions to the median height-of-lines value comprises:
   comparing a top of a color transition in the one or more color transitions against the median height-of-lines value; and
   disregarding, and saving for subsequent processing, an uppermost portion of the color transition when the top of the color transition exceeds a predefined threshold relative to the median height-of-lines value.

10. The method of claim 8 wherein said sizing the one or more color transitions to the median height-of-lines value comprises:
    adjusting a top of a color transition in the one or more color transitions to be within a predefined distance from the median height-of-lines value.

11. The method of claim 1, further comprising:
    storing the first chip score in association with the first chip denomination representation.

12. The method of claim 1 wherein said constructing a working chip template from the area-conformed color transitions comprises:
    determining a mean horizontal position based on individual horizontal positions of color transitions;
    selecting, in left right alternating fashion, from the area-conformed color transitions a previously unselected area-conformed color transition that is most nearly proximate to the mean horizontal position; and
    populating the working chip template with the previously unselected area-conformed color transition.

13. The method of claim 1 wherein said applying the first chip denomination representation against the working chip template comprises:
    identifying a sequence of one or more working-chip template color bands formed by one or more color transitions populating the working chip template;
    identifying a sequence of one or more color bands of the first chip denomination representation that correlate with the sequence of one or more working-chip template color bands;
    determining at least one of a mean radius value, a radius variance value, and a circle center value responsive to (a)

the identified sequence of one or more working-chip template color bands and (b) the identified sequence of one or more color bands of the first chip denomination representation that correlate with the sequence of one or more working-chip template color bands; and saving at least one of the mean radius value, the circle center value, and the radius variance value in association with the first chip denomination representation.

14. The method of claim 1 wherein said calculating a chip score responsive to said applying further comprises:
basing the chip score on at least one of a calculated radius compared against at least one of an expected radius, a calculated color score, and a number of color transitions used.

15. The method of claim 1, further comprising:
recalling a second chip denomination representation from a chip denomination representation library, the second chip denomination representation having at least one angle associated with at least one color transition;
applying the second chip denomination representation against the working chip template; and
calculating a second chip score responsive to said applying the second chip denomination representation.

16. The method of claim 1, further comprising
determining a horizontal position of a betting chip relative to the bet circle;
determining a depth position of the betting chip relative to the bet circle; and
determining a wager amount based on at least one of the horizontal and depth position of the betting chip relative to the bet circle.

17. The method of claim 1 wherein the first chip denomination representation includes a first sequence of colors, each one of the colors having a respective angle associated therewith, wherein the first sequence of colors of the first chip denomination exactly matches a sequence of colored markings about a perimeter of a chip.

18. The method of claim 1 wherein calculating a first chip score responsive to said applying the first chip denomination further includes:
iteratively calculating a series of radius values, each radius value corresponding to a respective presumed orientation of the chip;
determining a variance for each respective radius value; and
based upon the variances of the radius values, determining a center of a circle.

19. A computer-readable medium containing instruction for causing a computer to monitor wagering on a gaming table by:
acquiring an image of at least a portion of a gaming table having a bet circle;
selecting an area of the image proximate to the bet circle;
detecting color transitions at least partially in the area;
conforming the color transitions to the area to create area-conformed color transitions;
constructing a working chip template from the area-conformed color transitions;
recalling a first chip denomination representation from a chip denomination representation library, the first chip denomination representation having at least one angle associated with at least one color transition;
applying the first chip denomination representation against the working chip template; and
calculating a first chip score responsive to said applying the first chip denomination.

20. The computer-readable medium of claim 19 wherein the instructions cause the computer to construct a working chip template by:
calculating a mean horizontal position based on individual horizontal positions of color transitions;
selecting, in left right alternating fashion, from the area-conformed color transitions a previously unselected area-conformed color transition that is most nearly proximate to the mean horizontal position; and
populating the working chip template with the previously unselected area-conformed color transition.

21. The computer-readable medium of claim 19 wherein the instructions cause the computer to apply the first chip denomination representation against the working chip template by:
identifying a sequence of one or more working-chip template color bands formed by one or more color transitions populating the working chip template;
identifying a sequence of one or more color bands of the first chip denomination representation that correlate with the sequence of one or more working-chip template color bands;
calculating at least one of a mean radius value, a radius variance value, and a circle center value responsive to (a) the identified sequence of one or more working-chip template color bands and (b) the identified sequence of one or more color bands of the first chip denomination representation that correlate with the sequence of one or more working-chip template color bands; and
saving at least one of the mean radius value, the circle center value, and the radius variance value in association with the first chip denomination representation.

22. The computer-readable medium of claim 19 wherein the instructions cause the computer to calculate a chip score responsive to said applying by:
basing the chip score on at least one of a calculated radius compared against at least one of an expected radius, a calculated color score, and a number of color transitions used.

23. A wager monitoring system comprising:
a table imager positioned to acquire an image of at least a portion of a gaming table having a bet circle;
a recognition unit coupled to receive image data from the table imager and configured to select an area of the image proximate to the bet circle, detect color transitions at least partially in the area, conform the color transitions to the area to create area-conformed color transitions, construct a working template from the area-conformed color transitions, recall a first chip denomination representation from a chip denomination representation library, the first chip denomination representation having at least one angle associated with at least one color transition, apply the first chip denomination representation against the working chip template, and calculate a first chip score.

24. The wager monitoring system of claim 23 wherein the recognition unit comprises at least one of electrical circuitry having at least one discrete electrical circuit, electrical circuitry having at least one integrated circuit, electrical circuitry having at least one application specific integrated circuit, electrical circuitry having a general purpose computing device configured by a computer program, electrical circuitry having a memory device, and electrical circuitry having a communications device.

25. A method for use with identifying wagers in gaming, the method comprising:

illuminating at least a portion of a bet circle of a gaming table with monochromatic light;

acquiring an image of at least a portion of the gaming table having the bet circle;

constructing a working chip template from intensity transitions in the image;

recalling a first chip denomination representation from a chip denomination representation library, the first chip denomination representation having at least one angle associated with at least one intensity transition;

applying the first chip denomination representation against the working chip template; and calculating a first chip score responsive to said applying the first chip denomination.

26. A system for use with identifying wagers in gaming comprising:

means for illuminating at least a portion of a bet circle of a gaming with monochromatic light;

means for acquiring an image of at least a portion of the gaming table having the bet circle;

means for constructing a working chip template from intensity transitions in the image;

means for recalling a first chip denomination representation from a chip denomination representation library, the first chip denomination representation having at least one angle associated with at least one intensity transition;

means for applying the first chip denomination representation against the working chip template; and means for calculating a first chip score responsive to said means for applying the first chip denomination.

27. A wager monitoring system comprising:

means for acquiring an image of at least a portion of a gaming table having a bet circle;

means for selecting an area of the image proximate to the bet circle;

means for detecting color transitions at least partially in the area;

means for conforming the color transitions to the area to create area-conformed color transitions;

means for constructing a working chip template from the area-conformed color transitions;

means for recalling a first chip denomination representation from a chip denomination representation library, the first chip denomination representation having at least one angle associated with at least one color transition;

means for applying the first chip denomination representation against the working chip template; and means for calculating a first chip score responsive to said applying the first chip denomination.

28. The wager monitoring system of claim 27 wherein the means for constructing a working chip template from the area-conformed color transitions further comprise:

means for calculating a mean horizontal position based on individual horizontal positions of color transitions;

means for selecting, in left right alternating fashion, from the area-conformed color transitions a previously unselected area-conformed color transition that is most nearly proximate to the mean horizontal position; and means for populating the working chip template with the previously unselected area-conformed color transition.

* * * * *